(12) United States Patent
Vladimerou

(10) Patent No.: US 11,505,181 B2
(45) Date of Patent: Nov. 22, 2022

(54) SYSTEM, METHOD, AND COMPUTER-READABLE STORAGE MEDIUM FOR VEHICLE COLLISION AVOIDANCE ON THE HIGHWAY

(71) Applicant: TOYOTA MOTOR ENGINEERING & MANUFACTURING NORTH AMERICA, INC., Plano, TX (US)

(72) Inventor: Vladimeros Vladimerou, Whitmore Lake, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 97 days.

(21) Appl. No.: 16/240,097

(22) Filed: Jan. 4, 2019

(65) Prior Publication Data

US 2020/0216059 A1   Jul. 9, 2020

(51) Int. Cl.
| | | |
|---|---|---|
| *B60W 30/09* | (2012.01) | |
| *B60W 30/14* | (2006.01) | |
| *G01C 21/32* | (2006.01) | |
| *B60W 50/14* | (2020.01) | |
| *B60W 30/18* | (2012.01) | |
| *G06V 20/58* | (2022.01) | |
| *B60W 50/12* | (2012.01) | |
| *G05D 1/02* | (2020.01) | |

(52) U.S. Cl.
CPC .......... *B60W 30/09* (2013.01); *B60W 30/146* (2013.01); *B60W 30/18154* (2013.01); *B60W 50/12* (2013.01); *B60W 50/14* (2013.01); *G01C 21/32* (2013.01); *G05D 1/0214* (2013.01); *G05D 1/0223* (2013.01); *G06V 20/58* (2022.01); *B60W 2050/143* (2013.01)

(58) Field of Classification Search
None
See application file for complete search history.

(56) References Cited

U.S. PATENT DOCUMENTS

| | | | |
|---|---|---|---|
| 6,744,353 B2 * | 6/2004 | Sjonell | G01S 17/931 340/436 |
| 8,406,990 B2 | 3/2013 | Barkowski et al. | |
| 8,862,380 B2 * | 10/2014 | Jung | G01C 21/3602 701/300 |
| 9,760,092 B2 * | 9/2017 | Ferguson | G05D 1/0214 |

(Continued)

FOREIGN PATENT DOCUMENTS

WO   WO-2020099555 A1 *  5/2020  ............ B60W 10/04

*Primary Examiner* — Dale W Hilgendorf
(74) *Attorney, Agent, or Firm* — Oblon, McClelland, Maier & Neustadt, L.L.P.

(57) ABSTRACT

A host vehicle including a plurality of sensors communicably coupled to the host vehicle. Additionally, the host vehicle includes processing circuitry configured to map-match a location of the host vehicle while the host vehicle is operating on a highway, receive obstruction information from the plurality of sensors, the plurality of sensors having a predetermined field of view corresponding to a host vehicle field of view, estimate a driver field of view based on the host vehicle field of view, determine whether a speed of the host vehicle is safe based on the driver field of view and the obstruction information, and modify driver operation in response to a determination that the speed of the host vehicle is not safe based on the driver field of view.

17 Claims, 19 Drawing Sheets

(56) References Cited

U.S. PATENT DOCUMENTS

| | | | |
|---|---|---|---|
| 9,988,047 B2 | 6/2018 | Johnson et al. | |
| 10,023,114 B2 | 7/2018 | Adams et al. | |
| 10,460,182 B1* | 10/2019 | Park | G01S 13/867 |
| 10,466,712 B2* | 11/2019 | Ferguson | G05D 1/0231 |
| 10,527,443 B2* | 1/2020 | White | G01C 21/3626 |
| 11,397,433 B2* | 7/2022 | Shashua | G05D 1/0246 |
| 2005/0134440 A1* | 6/2005 | Breed | G01S 17/931 |
| | | | 701/45 |
| 2007/0005609 A1* | 1/2007 | Breed | G01S 5/0072 |
| 2007/0030212 A1* | 2/2007 | Shibata | G06T 5/50 |
| | | | 345/9 |
| 2009/0140881 A1* | 6/2009 | Sakai | B60R 1/00 |
| | | | 340/901 |
| 2009/0237269 A1* | 9/2009 | Okugi | G08G 1/163 |
| | | | 340/901 |
| 2010/0157430 A1* | 6/2010 | Hotta | G02B 27/01 |
| | | | 359/630 |
| 2011/0102195 A1* | 5/2011 | Kushi | G08G 1/096783 |
| | | | 340/905 |
| 2012/0218125 A1* | 8/2012 | Demirdjian | G08G 1/164 |
| | | | 340/905 |
| 2012/0268262 A1* | 10/2012 | Popovic | G02B 27/01 |
| | | | 340/438 |
| 2013/0181823 A1* | 7/2013 | Stahlin | G08G 1/166 |
| | | | 340/436 |
| 2013/0245877 A1* | 9/2013 | Ferguson | G08G 1/167 |
| | | | 701/23 |
| 2013/0282268 A1* | 10/2013 | Goerick | B60W 30/095 |
| | | | 701/301 |
| 2014/0218530 A1 | 8/2014 | Sinclair | |
| 2016/0210853 A1* | 7/2016 | Koravadi | G06K 9/00791 |
| 2016/0275790 A1* | 9/2016 | Kang | G06Q 10/10 |
| 2017/0076599 A1* | 3/2017 | Gupta | G08G 1/164 |
| 2017/0101056 A1* | 4/2017 | Park | G08G 1/04 |
| 2017/0345299 A1* | 11/2017 | Gupta | B60C 9/00 |
| 2017/0371338 A1* | 12/2017 | Kamata | G05D 1/0274 |
| 2018/0194285 A1* | 7/2018 | Herrmann | G06V 20/58 |
| 2018/0370433 A1* | 12/2018 | Huang | G06K 9/00805 |
| 2019/0143968 A1* | 5/2019 | Song | G06V 20/588 |
| | | | 701/301 |
| 2019/0143989 A1* | 5/2019 | Oba | A61B 3/113 |
| | | | 701/70 |
| 2019/0168610 A1* | 6/2019 | Nakane | H04N 5/66 |
| 2019/0171024 A1* | 6/2019 | Tumler | G02B 27/017 |
| 2019/0244515 A1* | 8/2019 | Hacker | G08G 1/167 |
| 2020/0033140 A1* | 1/2020 | Gautam | G01S 13/931 |
| 2020/0193629 A1* | 6/2020 | Bade | G06K 9/00805 |

\* cited by examiner

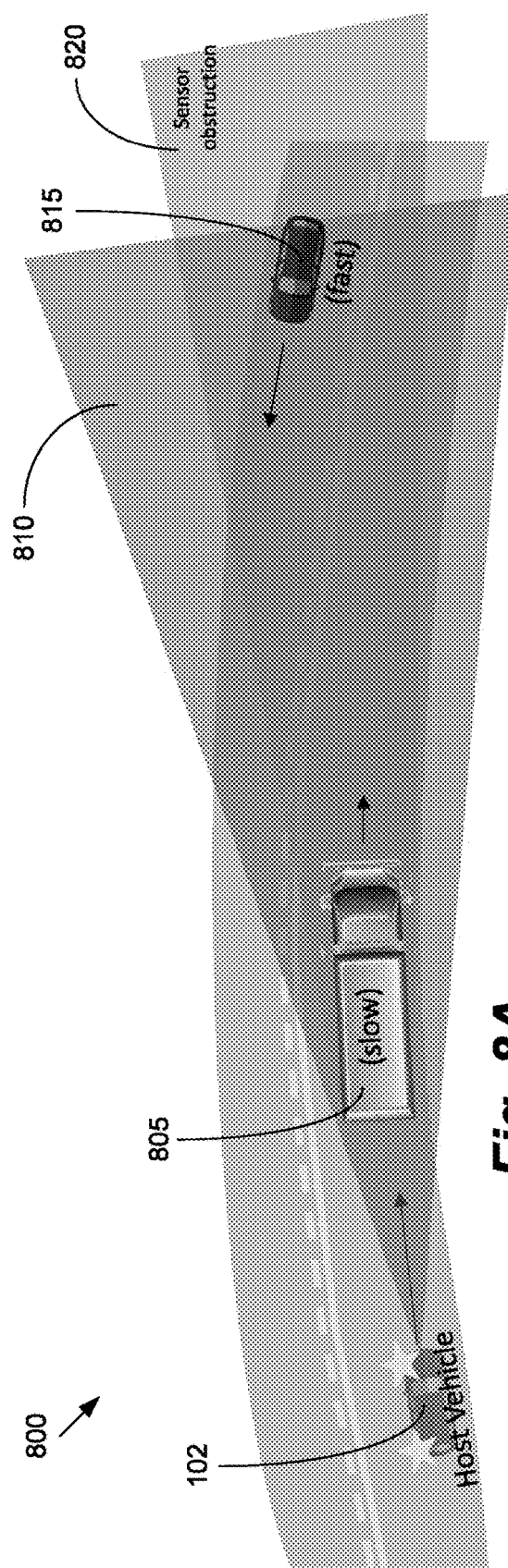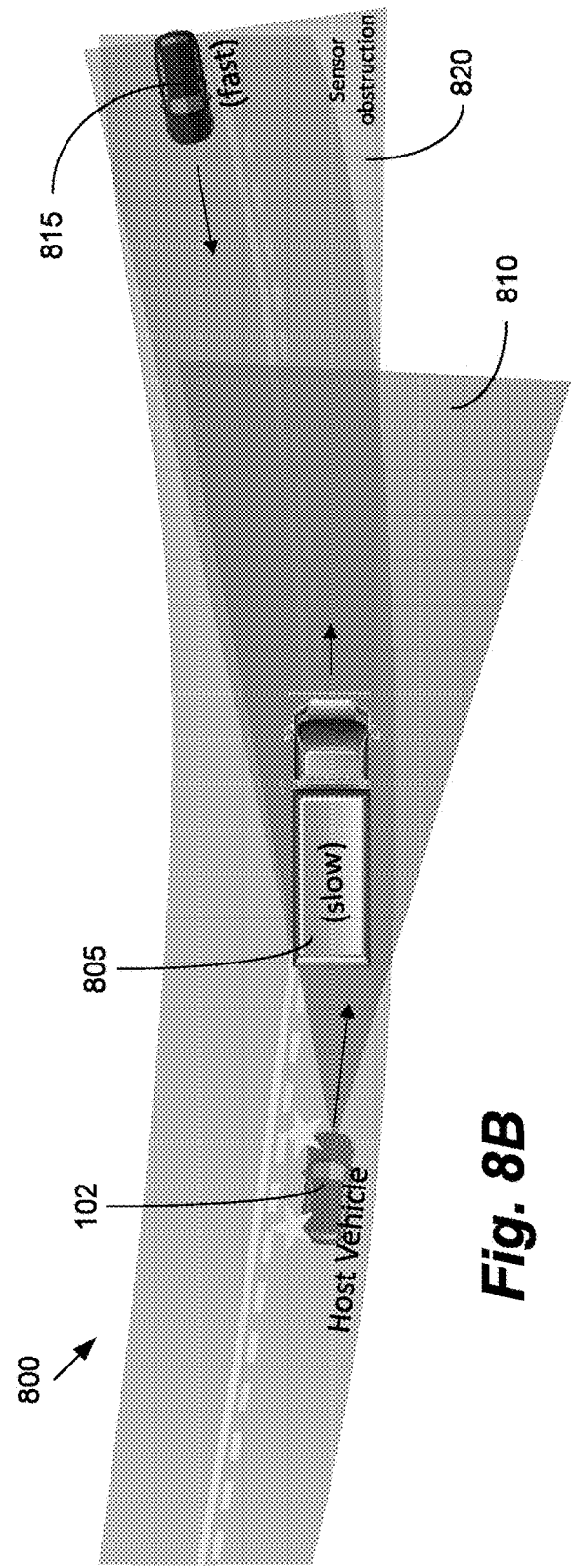
Fig. 8A
Fig. 8B

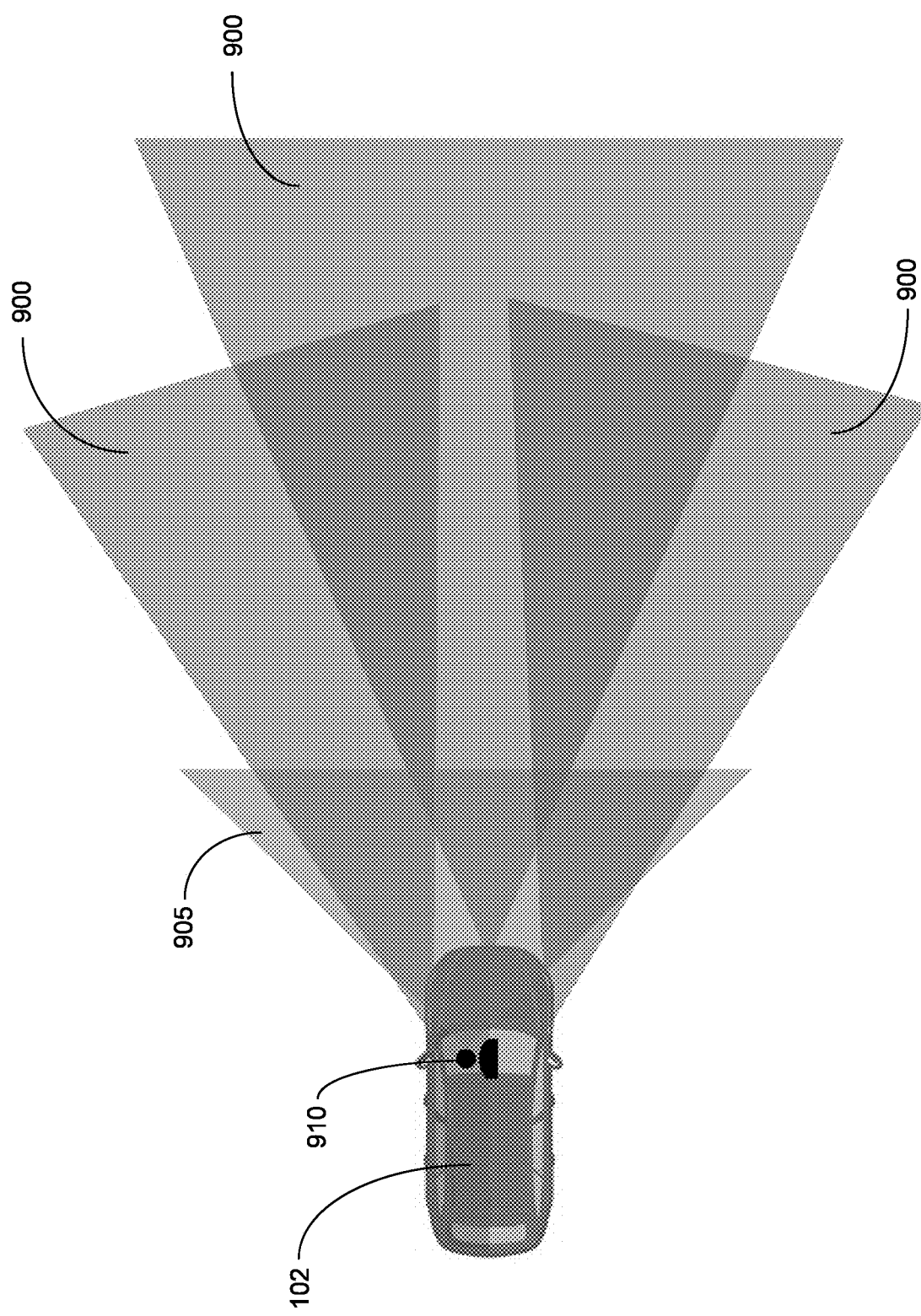

SYSTEM, METHOD, AND COMPUTER-READABLE STORAGE MEDIUM FOR VEHICLE COLLISION AVOIDANCE ON THE HIGHWAY

CROSS-REFERENCE TO RELATED APPLICATION

This application is related to application Ser. No. 16/240,053 (Oblon Ref. No.: 515118US) filed Jan. 4, 2019, now U.S. Pat. No. 10,974,732, and application Ser. No.: 16/240,076 Oblon Ref. No.: 515119US) filed Jan. 4, 2019 which are incorporated herein by reference in their entirety.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Generally, drivers do not check the behavior of other vehicles at a traffic intersection when they know they have priority at a signalized or controlled intersection. For example, at traffic lights, when a driver has the green light, the driver commonly enters an intersection without checking for the possibility that intersecting traffic may violate predetermined traffic patterns for that intersection (e.g., an intersecting vehicle runs a red light). As a result, crashes can happen when intersecting traffic is not visible or observed. Additionally, drivers may attempt to overtake a preceding vehicle despite one or more oncoming vehicles being hidden by various obstacles. Further, in a similar situation, drivers may not be prepared to avoid sudden slow-downs on highways. For example, when traveling on highways in fast traffic, drivers may not be able to see or may not estimate the speed of traffic as far ahead as they should. This can result in not being prepared for unexpected and unmitigated slow-downs with a high risk of collision with one or more preceding vehicles.

SUMMARY

According to aspects of the disclosed subject matter, a host vehicle includes a plurality of sensors communicably coupled to the host vehicle. Additionally, the host vehicle includes processing circuitry configured to map-match a location of the host vehicle in response to approaching a traffic intersection, receive traffic intersection information from the plurality of sensors in response to approaching the traffic intersection, the plurality of sensors having a predetermined field of view corresponding to a host vehicle field of view, estimate a driver field of view based on the host vehicle field of view, determine whether navigating through the traffic intersection is safe based on the driver field of view, and modify driver operation in response to a determination that navigation through the traffic intersection is not safe based on the driver field of view.

In another embodiment, a host vehicle includes a plurality of sensors communicably coupled to the host vehicle. Additionally, the host vehicle includes processing circuitry configured to map-match a location of the host vehicle in response to approaching a preceding vehicle, receive overtaking information from the plurality of sensors in response to the host vehicle approaching the preceding vehicle, the plurality of sensors having a predetermined field of view corresponding to a host vehicle field of view, estimate a driver field of view based on the host vehicle field of view, determine whether overtaking the preceding vehicle is safe based on the driver field of view, and modify driver operation in response to a determination that overtaking the preceding vehicle is not safe based on the driver field of view.

In another embodiment, a host vehicle including a plurality of sensors communicably coupled to the host vehicle. Additionally, the host vehicle includes processing circuitry configured to map-match a location of the host vehicle while the host vehicle is operating on a highway, receive obstruction information from the plurality of sensors, the plurality of sensors having a predetermined field of view corresponding to a host vehicle field of view, estimate a driver field of view based on the host vehicle field of view, determine whether a speed of the host vehicle is safe based on the driver field of view and the obstruction information, and modify driver operation in response to a determination that the speed of the host vehicle is not safe based on the driver field of view.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8A illustrates an overtaking area according to one or more aspects of the disclosed subject matter;

FIG. 8B illustrates an overtaking area according to one or more aspects of the disclosed subject matter;

FIG. 9 illustrates a host vehicle field of view of the host vehicle and a driver field of view of a driver according to one or more aspects of the disclosed subject matter;

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "front," "rear," "side," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Figure 1:
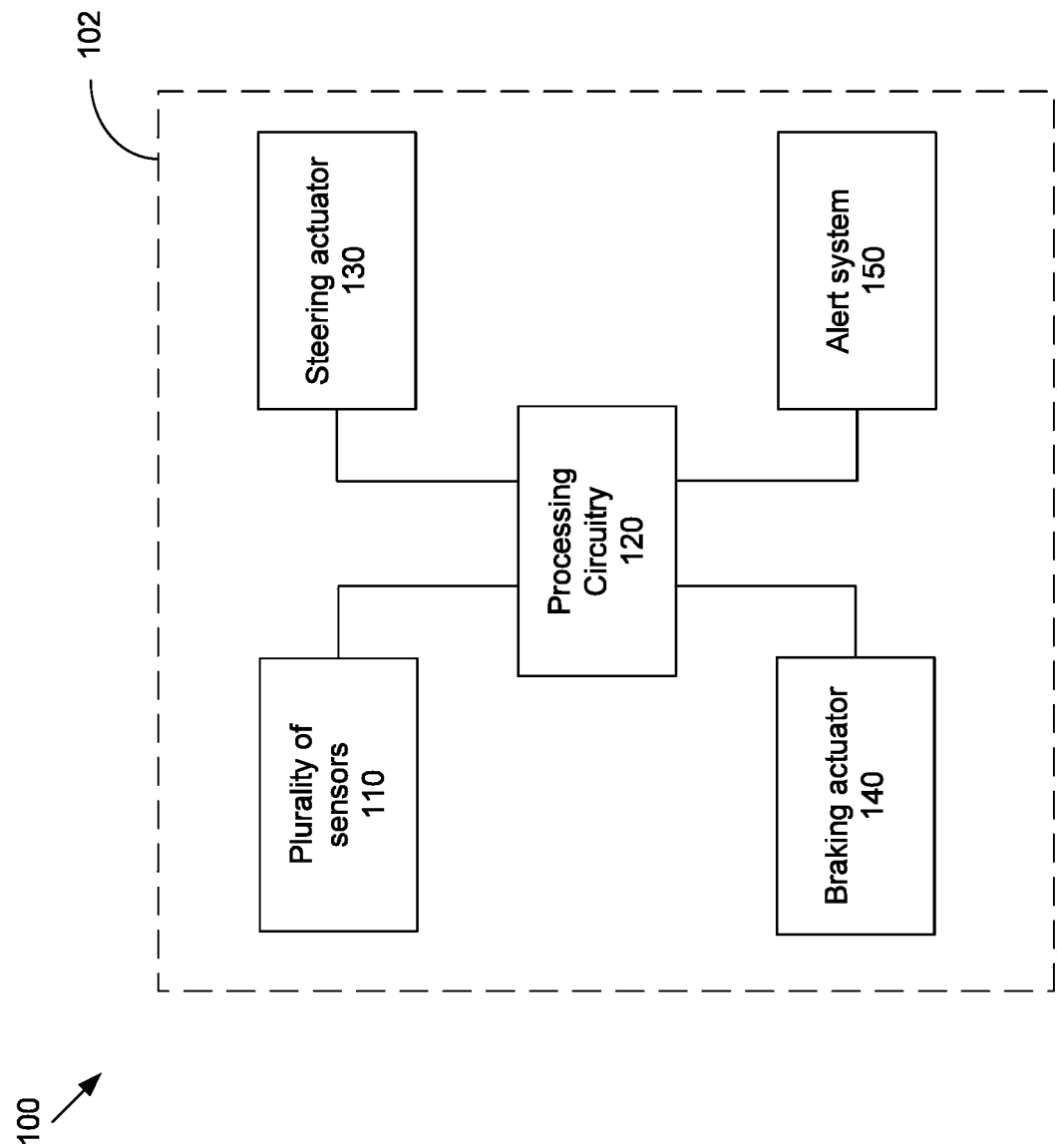
FIG. 1 illustrates an exemplary system configured for improving the safety in various driving situations according to one or more aspects of the disclosed subject matter.

Referring now to the drawings, wherein like reference numerals designate identical or corresponding parts throughout the several views, FIG. 1 illustrates an exemplary system 100 configured for improving safety in various driving situations including navigating a traffic intersection, overtaking a preceding vehicle, and avoiding collisions with sudden slow and/or stopped traffic on a highway according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

The system 100 can include a plurality of sensors 110, processing circuitry 120 (which can include internal and/or external memory), a steering actuator 130, a braking actuator 140, and an alert system 150. In an embodiment, the plurality of sensors 110, the processing circuitry 120 (which can include internal and/or external memory), the steering actuator 130, the braking actuator 140, and the alert system 150 can be implemented in a stand-alone apparatus 102. For example, the plurality of sensors 110, the steering actuator 130, the braking actuator 140, and the alert system 150 can be communicably coupled to the stand-along apparatus 102. The stand-alone apparatus 102 can be a host vehicle operated by a driver. Alternatively, or additionally, the host vehicle 102 can be an autonomous vehicle or a highly automated vehicle, for example. For convenience and clarity in the description, the stand-alone apparatus 102 may be referred to herein as the host vehicle 102, wherein the host vehicle 102 may include at least partial autonomous vehicle control via the steering actuator 130 and the braking actuator 140, for example. Additionally, throughout the description, the term traffic can be used to describe one or more vehicles, bikes, pedestrians, electric vehicles (e.g., electric cars/trucks, electric scooters, electric skateboards, etc.), obstructions, and the like. Additionally, the term vehicle can also be used to describe one or more vehicles, bikes, pedestrians, electric vehicles (e.g., electric cars/trucks, electric scooters, electric skateboards, etc.), obstructions, and the like.

Generally speaking, the processing circuitry 120 can improve the safety in various driving situations including navigating a traffic intersection, overtaking a preceding vehicle, and avoiding collisions with sudden slow and/or stopped traffic on a highway. In one embodiment, the processing circuitry 120 can reduce the possibility of a crash at intersections. Drivers rarely check the behavior of traffic intersections when they know they have priority at signalized or controlled intersections. For example, when a driver has the green light at a traffic intersection, the driver enters an intersection without checking the possibility that intersecting traffic may violate intersection priority (e.g., an intersecting vehicle runs a red light). These crashes happen most frequently when intersecting traffic is not visible or observed. Accordingly, the processing circuitry 120 can assist in safely navigating traffic intersections.

More specifically, the processing circuitry 120 can receive traffic intersection information from the plurality of sensors 110. The plurality of sensors 110 can include one or more imaging devices, LiDAR, RADAR, ultrasonic sensors, and the like to gather information about the environment surrounding the host vehicle 102. Using the traffic intersection information received from the plurality of sensors 110, the processing circuitry 120 can further evaluate the safety of the traffic intersection and assist the host vehicle 102 and/or the driver of the host vehicle 120 in navigating the traffic intersection. The plurality of sensors 110 can provide a host vehicle field of view which can be constrained by limitations of the sensors. Based on the host vehicle field of view, the processing circuitry 120 can estimate a driver field of view, and based on the driver field of view, the processing circuitry 120 can determine if any vehicles could be hidden at the traffic intersection (e.g., a vehicle may be hidden behind another vehicle or foliage, or a building, etc). In the even that a vehicle may be hidden, the processing circuitry can determine that the driver field of view is obstructed by the vehicle, and because the vehicle in the driver field of view may be blocking another vehicle (e.g., hidden vehicle), the driver may enter the traffic intersection believing that it is safe. Accordingly, the processing circuitry 120 can prevent a potential collision by alerting and/or modifying the driver's operation of the host vehicle 102.

Figure 2:
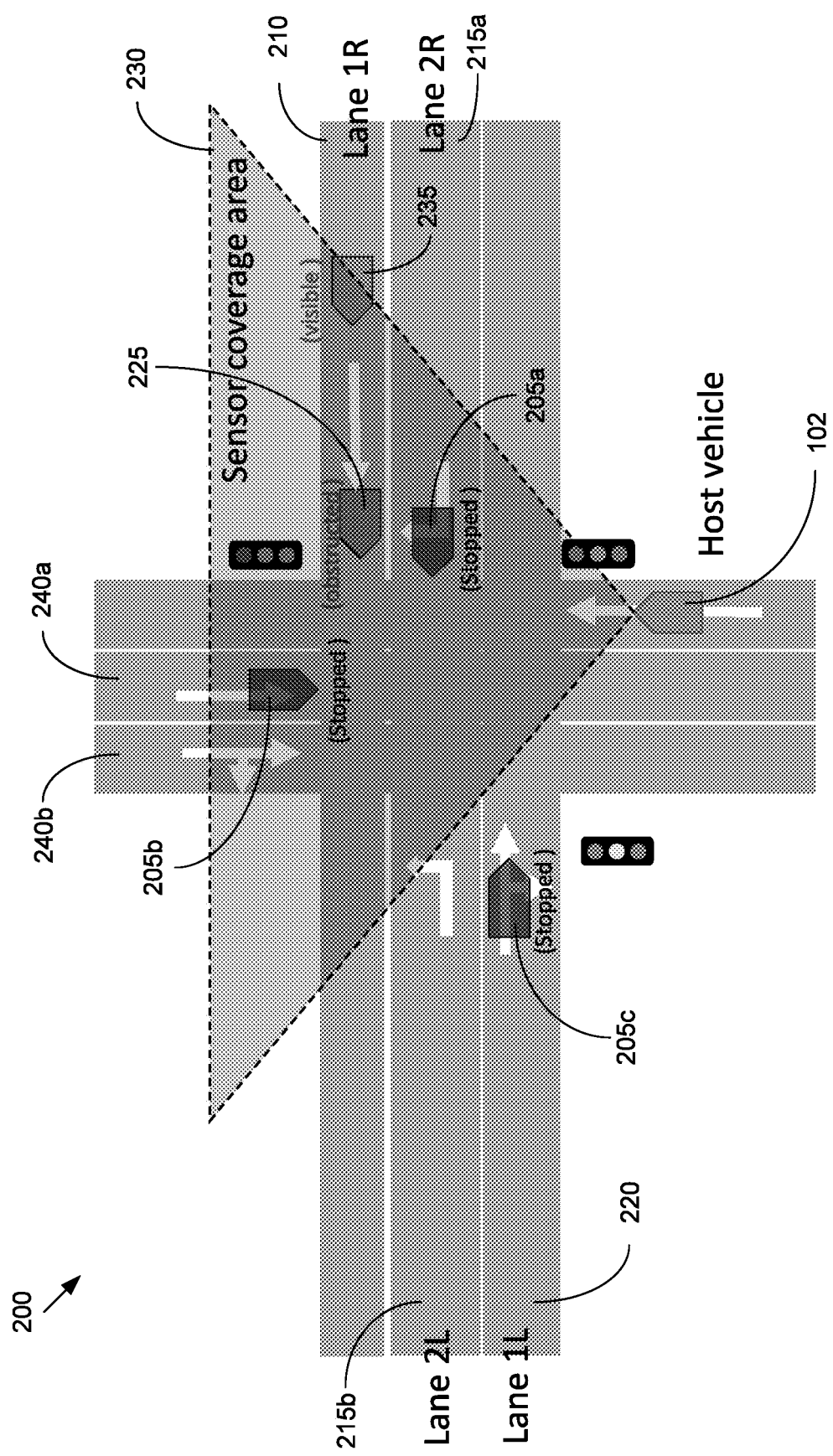
FIG. 2 illustrates an exemplary traffic intersection according to one or more aspects of the disclosed subject matter.

FIG. 2 illustrates a traffic intersection 200 according to one or more aspects of the disclosed subject matter. The traffic intersection 200 can include a plurality of stopped vehicles 205a, 205b, and 205c, where stopped vehicle 205a is in a second right intersecting lane 215a, stopped vehicle 205b is in a first oncoming lane 240a (oncoming lane 240b is empty), and stopped vehicle 205c is in a first left intersecting lane 220. In this example, a second left intersecting lane 215b is empty. Additionally, a first right intersecting lane 210 includes an obstructed vehicle 225 and a visible vehicle 235. The obstructed vehicle 225 is hidden by the stopped vehicle 205a. Additionally, a sensor coverage area 230 can correspond to a host vehicle field of view defined by the limitations of the plurality of sensors 110, for example, where the plurality of sensors 110 have a predetermined distance and width of view. In FIG. 2, the stopped vehicles 205a and 205b, the obstructed vehicle 225, and the visible vehicle 235 are in the host vehicle field of view 230. However, the obstructed vehicle 225 is hidden by the stopped vehicle 205a. As further described herein, the processing circuitry 120 can determine that a vehicle could be hidden from view (e.g., obstructed vehicle 225) in the traffic intersection 200 and assist the host vehicle 102 in navigating the intersection safely. It should be appreciated that the traffic intersection 200 is exemplary, and the processing circuitry 120 can assist the host vehicle 102 in navigating a variety of traffic intersection configurations including various stopped, obstructed, and visible vehicle locations.

Figure 3:
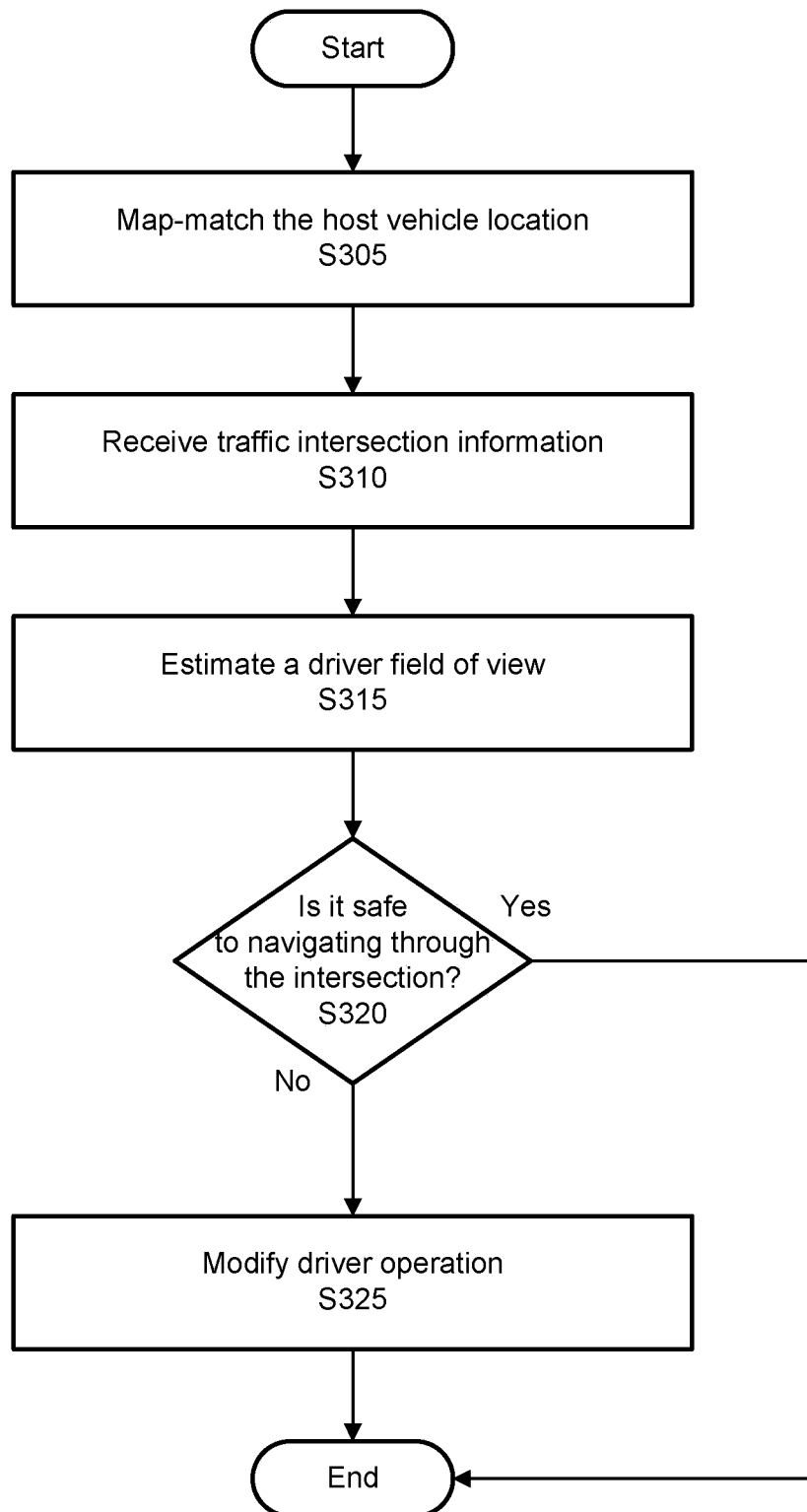
FIG. 3 illustrates an algorithmic flow chart of a method for traffic intersection navigation according to one or more aspects of the disclosed subject matter.

FIG. 3 illustrates an algorithmic flow chart of a method for traffic intersection navigation according to one or more aspects of the disclosed subject matter.

In S305, the processing circuitry 120 of the host vehicle 102 can map-match the host vehicle location in response to approaching a traffic intersection (e.g., traffic intersection 200).

In S310, the host vehicle 102 can receive traffic intersection information from the plurality of sensors 110 in response to approaching the traffic intersection. Additionally, the plurality of sensors 110 can have a predetermined field of view corresponding to a field of view of the host vehicle. In other words, the host vehicle field of view can be constrained by the limitations of the plurality of sensors 102. For example, the plurality of sensors 102 may be limited to a predetermined viewing distance and a predetermined viewing width. Additionally, there may be one or more objects and/or obstructions in the host vehicle field of view that may constrain the host vehicle field of view. For example, a vehicle may be hidden by another vehicle within the host vehicle field of view, thereby limiting the host vehicle field of view.

In S315, the host vehicle 102 (e.g., via the processing circuitry 120) can estimate a driver field of view based on the host vehicle field of view. For example, the predetermined distance and width of the host vehicle field of view can be used to estimate a driver's field of view from inside the host vehicle (e.g., a vehicle operator in the driver's seat of the host vehicle). Additionally, if the host vehicle field of view recognizes a potential obstruction, the host vehicle 102 may use that information to estimate that the driver may not be able to see past the obstruction, which constrains the driver's field of view.

In S320, the processing circuitry 120 can determine whether navigating through the traffic intersection is safe based on the driver field of view. If it is determined that navigating through the traffic intersection is safe based on the driver field of view, the process can end. However, if it is determined that navigating through the traffic intersection is not safe based on the driver field of view, the host vehicle 102 can modify the driver's operation in S325.

In S325, the host vehicle 102 can modify driver operation in response to a determination that navigation through the traffic intersection is not safe based on the driver field of view. For example, the host vehicle 102 (e.g., by the processing circuitry 120) can alert the driver to inform the driver that navigating the intersection is not safe and/or automatically modify (e.g., reduce) the driving speed of the host vehicle 102 (e.g., by the braking actuator 140). After modifying the driver operation in S325, the processing can end.

Figure 4:
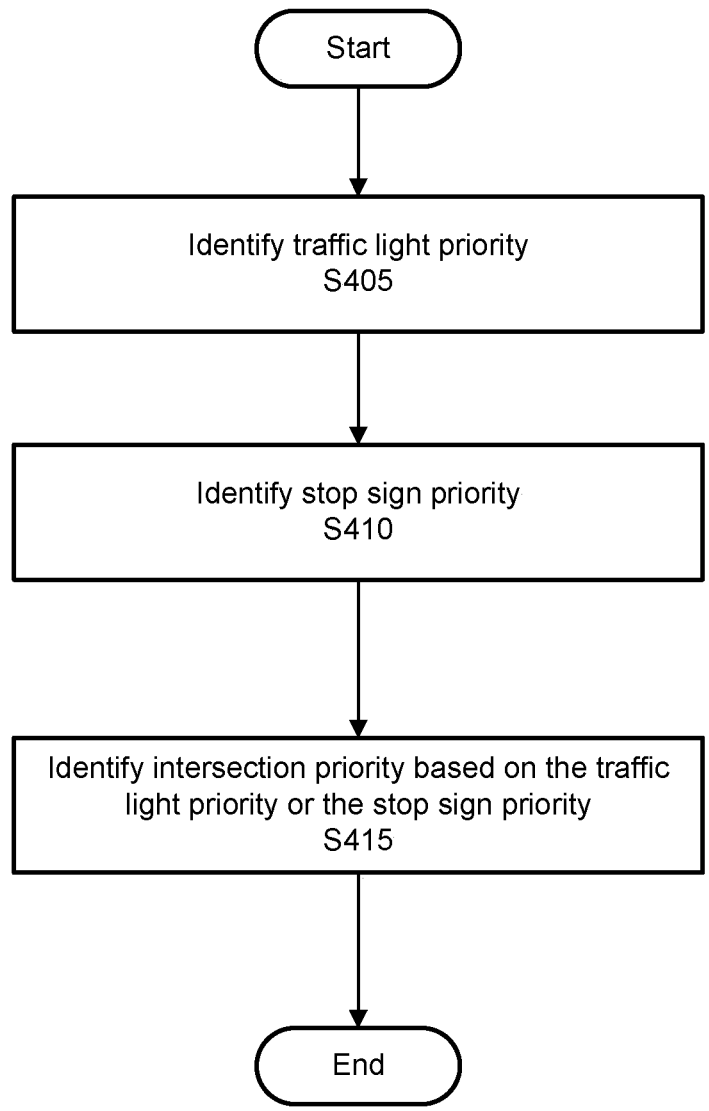
FIG. 4 illustrates an algorithmic flow chart of a method for determining intersection priority according to one or more aspects of the disclosed subject matter.

FIG. 4 illustrates an algorithmic flow chart of a method for determining intersection priority according to one or more aspects of the disclosed subject matter.

In S405, the processing circuitry 120 can identify the traffic light priority of the intersection based on the traffic intersection information (e.g., the traffic intersection information received from the plurality of sensors in S310 in FIG. 3).

In S410, the processing circuitry 120 can identify the stop sign priority of the intersection based on the traffic intersection information (e.g., the traffic intersection information received from the plurality of sensors in S310 in FIG. 3).

In S415, the processing circuitry 120 can identify an intersection priority of the entire intersection based on the traffic light priority in S405 and/or the stop sign priority in S410 based on the set up of the intersection. After the intersection priority is identified, the process can end.

Figure 5:
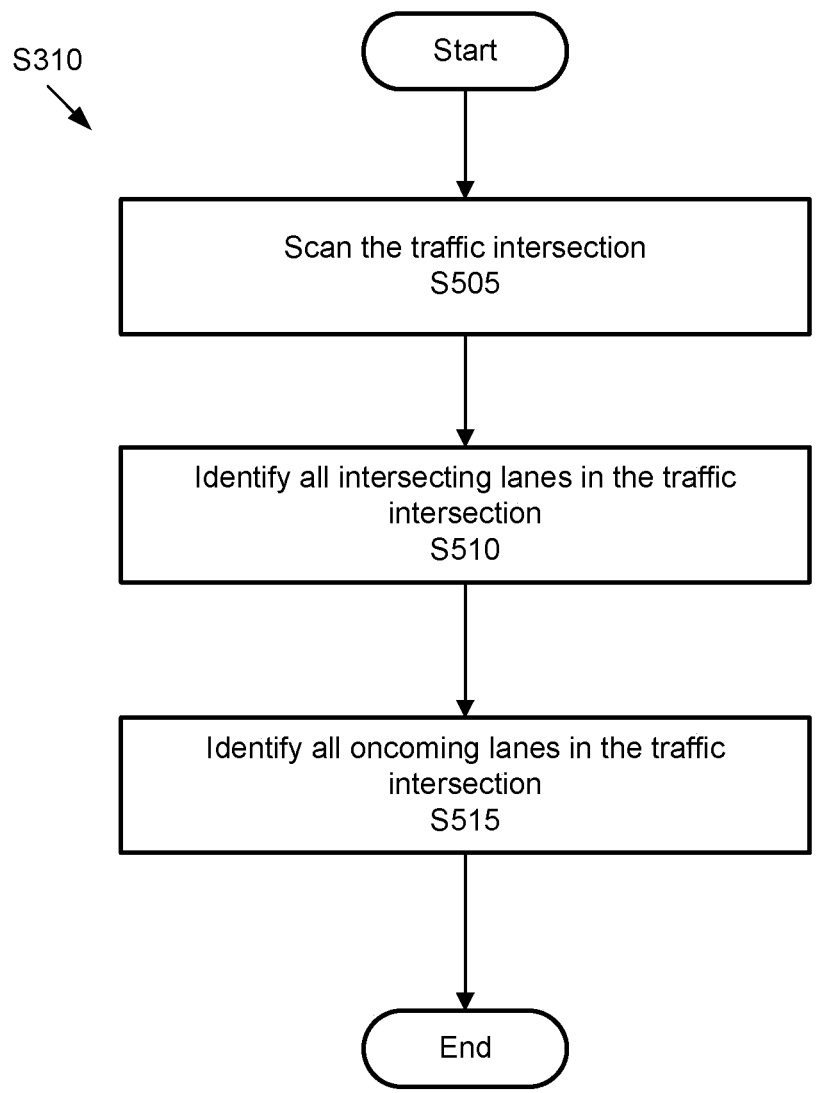
FIG. 5 illustrates an algorithmic flow chart of a method for receiving the traffic intersection information according to one or more aspects of the disclosed subject matter.

FIG. 5 illustrates an algorithmic flow chart of a method for receiving the traffic intersection information according to one or more aspects of the disclosed subject matter. For example, the method for receiving the traffic intersection information can correspond to S310 in FIG. 3.

In S505, the plurality of sensors 110 can scan the traffic intersection. The information gathered by the plurality of sensors 110 can include various information regarding the set up and logistics of the intersection (e.g., intersection priority) by identifying the timing of the lights and/or stop signs, the number and position of vehicles, bikes, pedestrians, etc., and the like.

In S510, the processing circuitry 120 can identify all intersecting lanes (e.g., intersecting lanes 210, 215a, 215b, and 220) in the traffic intersection based on the scan.

In S515, the processing circuitry 120 can identify all oncoming lanes in the traffic intersection based on the scan (e.g., oncoming lanes 240a, 240b). After identifying the oncoming lanes in the traffic intersection, the process can end.

Figure 6:
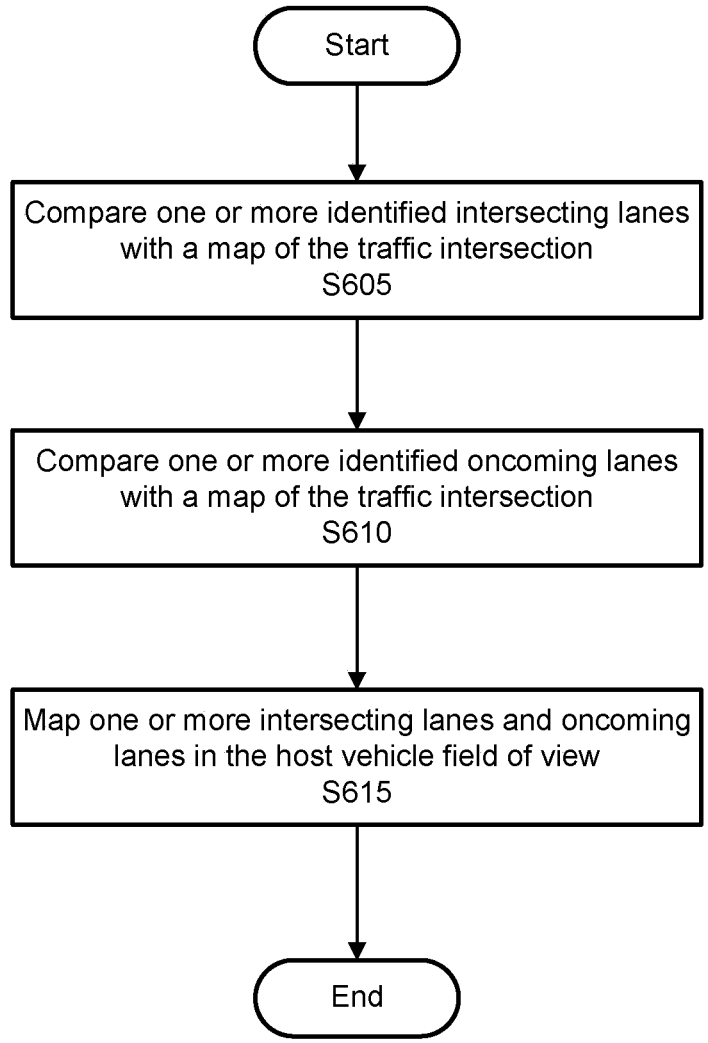
FIG. 6 is an algorithmic flow chart of a method for mapping the host vehicle field of view according to one or more aspects of the disclosed subject matter.

FIG. 6 is an algorithmic flow chart of a method for mapping the host vehicle field of view according to one or more aspects of the disclosed subject matter.

In S605, the processing circuitry 120 can compare one or more identified intersecting lanes (e.g., the identified intersecting lanes received as part of the traffic intersection information) with a map of the traffic intersection from the map-matched host vehicle location.

In S610, the processing circuitry 120 can compare one or more identified oncoming lanes (e.g., the identified oncoming lanes received as part of the traffic intersection information) with a map of the traffic intersection from the map-matched host vehicle location.

In S615, the processing circuitry 120 can map one or more intersecting lanes and oncoming lanes in the host vehicle field of view. In other words, based on comparing the map of the traffic intersection with the host vehicle field of view, the one or more intersecting and oncoming lanes that are in the host vehicle field of view can be identified. After mapping the one or more intersecting lanes and oncoming lanes in the host vehicle field of view, the process can end.

Figure 7:
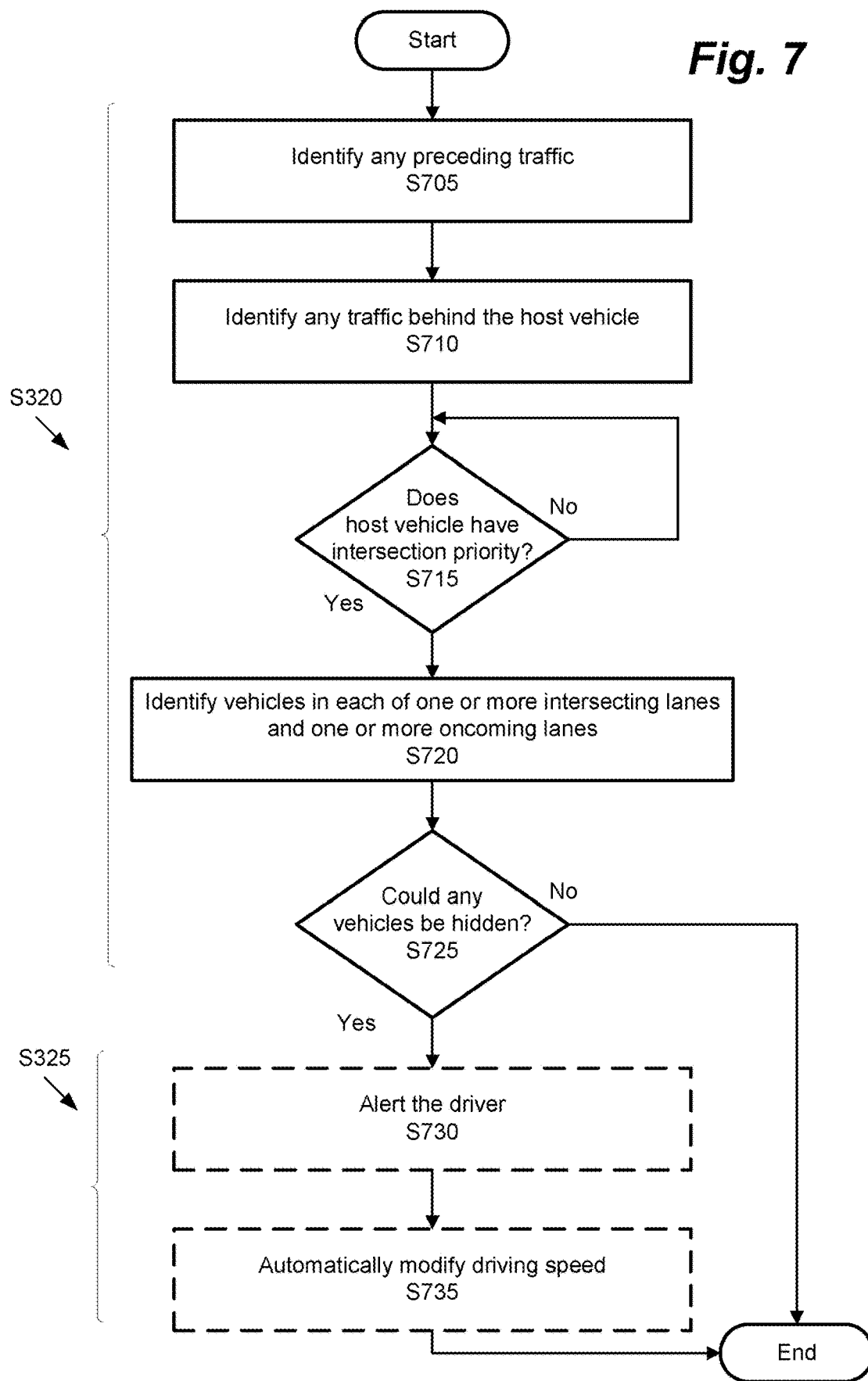
FIG. 7 illustrates an algorithmic flow chart of a method for safely navigating a traffic intersection according to one or more aspects of the disclosed subject matter.

FIG. 7 illustrates an algorithmic flow chart of a method for safely navigating a traffic intersection according to one or more aspects of the disclosed subject matter. In FIG. 7, steps S705 through S725 can correspond to S320 and steps S730 and S735 can correspond to S325, for example.

In S705, the processing circuitry 120 can identify any preceding traffic based on the information received from the plurality of sensors 110. For example, preceding traffic can be any traffic in front of the host vehicle 102. Additionally, traffic can correspond to one vehicle or multiple vehicles. Further, traffic may also refer to one or more pedestrians, bikes, electric vehicles (e.g., electric skateboards, electric scooters, etc.), obstructions, and the like.

In S710, the processing circuitry 120 can identify any traffic behind the host vehicle based on the information received from the plurality of sensors 110.

In S715, the processing circuitry 120 can determine whether the host vehicle 102 has priority in the traffic intersection based on the traffic intersection information including traffic light priority and stop sign priority, for example. If the host vehicle 102 does not have priority, the process can return to S715 to continue checking whether the host vehicle 102 has priority. If the host vehicle 102 does have priority, the process can continue to identify traffic in each of one or more intersecting lanes and one or more oncoming lanes in S720.

In S720, the processing circuitry 120 can identify vehicles and/or traffic in each of one or more intersecting lanes and one or more oncoming lanes. The vehicles can be identified based on the received traffic intersection information which is based on the plurality of sensors 110, for example.

In S725, the processing circuitry 120 can determine if any traffic could be hidden by the identified vehicles or other obstacles (e.g., buildings, trees, shrubs, foliage, signs, walls, etc.) based on the host vehicle field of view and whether the vehicles that could be hidden are in an unblocked lane. In other words, the processing circuitry 120 can recognize, based on various information including the host vehicle field of view, the identified vehicles (or other obstacles) in the host vehicle field of view, and the set-up of the traffic intersection, whether another vehicle could be hidden by one of the identified vehicles or other obstacles, and particularly, whether the potentially hidden vehicle would be in an unblocked lane. A hidden vehicle in an unblocked may be dangerous because it could enter the traffic intersection even when the hidden vehicle does not have traffic intersection priority. By recognizing that vehicles may be hidden behind the identified vehicles, the processing circuitry 120 can modify the driver's operation of the host vehicle 102 to prevent a collision and generally assist in safely navigating the traffic intersection. In response to a determination that a vehicle could not be hidden, the process can end. However, in response to a determination that a vehicle could be hidden and/or in an unblocked lane, the host vehicle 102 can perform one or more of alerting the driver in S730 and automatically modifying the driving speed of the host vehicle 102 in S735.

In S730, the processing circuitry 120 can alert the driver in response to the determination that vehicles could be hidden in unblocked lanes. The alert can include one or more of audio, visual, and tactile alerts informing the driver that navigating the traffic intersection is not safe. For example, navigating the intersection may not be safe based on the host vehicle's current speed because if a hidden vehicle were to enter the traffic intersection without priority, the host vehicle 102 and/or the driver of the host vehicle 102 would not be able to react in time, which may lead to a collision.

In S735, the processing circuitry 120 can automatically modify a driving speed of the host vehicle 102 in response to the determination that vehicles could be hidden in unblocked lanes. For example, the driving speed of the host vehicle may be reduced automatically (e.g., by the braking actuator 140) to provide the host vehicle 102 and/or the driver of the host vehicle 102 more time to react to a potentially hidden vehicle entering the intersection without priority. After automatically modifying the host vehicle driving speed, the process can end. It should be appreciated that S730 and S735 may both occur, or optionally, one of S730 or S735 can occur in response to the determination that the navigating the traffic intersection is not safe, which can be selected ahead of time by the driver, for example.

FIG. 8A illustrates an overtaking area 800 according to one or more aspects of the disclosed subject matter. In FIG. 8A, passing is prohibited in the overtaking area. The host vehicle 102 is behind a preceding vehicle 805. However, a host vehicle field of view 810 is obstructed by the preceding vehicle 805. An obstructed portion 820 corresponds to a portion of the host vehicle field of view 810 obstructed by the preceding vehicle 805. Additionally, an oncoming vehicle 815 is in the obstructed portion 820. Accordingly, the oncoming vehicle 815 is hidden in the overtaking area because the oncoming vehicle 815 is obstructed from the host vehicle 102. Even though overtaking the preceding vehicle is prohibited in the overtaking area in FIG. 8A, the processing circuitry 120 can assist in safely overtaking the preceding vehicle by alerting and/or preventing the host vehicle 102 from overtaking the preceding vehicle 805 because there may be another vehicle hidden in the overtaking area (e.g., oncoming vehicle 815).

FIG. 8B illustrates an overtaking area 800 according to one or more aspects of the disclosed subject matter. In FIG. 8B, overtaking a preceding vehicle is allowed. The description of the overtaking area 800 is the same as in FIG. 8A other than that overtaking the preceding vehicle is allowed. However, for analogous reasons as described in FIG. 8A, the processing circuitry 120 can prevent the host vehicle 102 from overtaking the preceding vehicle 805 in FIG. 8B because another vehicle (e.g., oncoming vehicle 815) could be hidden in the overtaking area 800. It should be appreciated that the overtaking area 800 in FIGS. 8A and 8B is exemplary, and the processing circuitry 120 can assist the host vehicle 102 in various overtaking situations including various numbers of preceding vehicles, road geometries, topography, and the like.

FIG. 9 illustrates an exemplary host vehicle field of view 900 of the host vehicle 102 and a driver field of view 905 of a driver 910 according to one or more aspects of the disclosed subject matter. For example, the plurality of sensors 110 can combine to form the host vehicle field of view 900. The plurality of sensors 110 may have various width and distance limitations to the field of view. Additionally, the driver field of view 905 can be estimate based on the host vehicle field of view 900. For example, the processing circuitry 120 can infer that if a portion of the host vehicle field of view 900 is obstructed, the driver field of view 905 is also obstructed in the same way. Additionally, if a portion of the environment of host vehicle 102 is outside the host vehicle field of view 900, it may also be outside the driver field of view 905. It should be appreciated that the host vehicle field of view 900 is exemplary and any host vehicle fields of view based on various combinations of sensors in the plurality of sensors 110 can be configured for use with the system 100.

Figure 10:
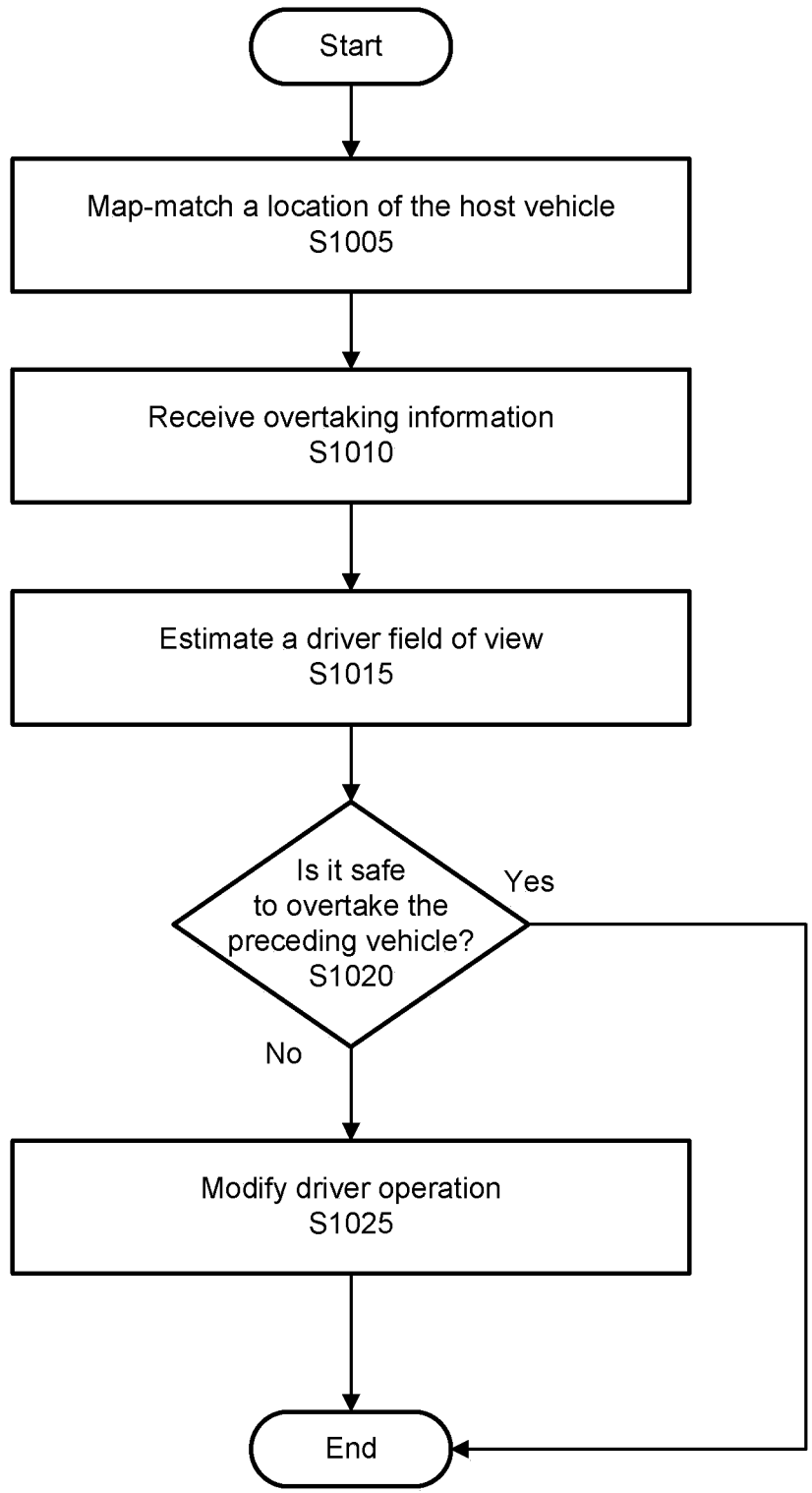
FIG. 10 is an algorithmic flow chart of a method for overtaking a preceding vehicle according to one or more aspects of the disclosed subject matter.

FIG. 10 is an algorithmic flow chart of a method for overtaking a preceding vehicle according to one or more aspects of the disclosed subject matter.

In S1005, the processing circuitry 120 of the host vehicle 102 can map-match the host vehicle location in response to approaching preceding vehicle (e.g., preceding vehicle 805).

In S1010, the host vehicle 102 can receive overtaking information from the plurality of sensors 110 in response to approaching the preceding vehicle. The overtaking information can include various data gathered by the plurality of sensors 110 including information about the environment surrounding the host vehicle 102 (e.g., identifying preceding vehicles, topology of the overtaking area, and the like as further described herein). Using the overtaking information received from the plurality of sensors 110, the processing circuitry 120 can further evaluate the safety of the overtaking area and assist the host vehicle 102 and/or the driver of the host vehicle 120 in navigating the traffic intersection. Additionally, the plurality of sensors 110 can have a predetermined field of view corresponding to a field of view of the host vehicle as further described herein.

In S1015, the host vehicle 102 (e.g., via the processing circuitry 120) can estimate a driver field of view based on the host vehicle field of view as further described herein.

In S1020, the processing circuitry 120 can determine whether overtaking the preceding vehicle is safe based on the driver field of view. If it is determined that overtaking the preceding vehicle is safe based on the driver field of view, the process can end. However, if it is determined that overtaking the preceding vehicle is not safe based on the driver field of view, the host vehicle 102 can modify the driver's operation in S1025.

In S1025, the host vehicle 102 can modify driver operation in response to a determination that navigation through the traffic intersection is not safe based on the driver field of view. For example, the host vehicle 102 (e.g., by the processing circuitry 120) can alert the driver to inform the driver that overtaking the preceding vehicle is not safe and/or automatically actuate steering of the host vehicle 102 (e.g., by the steering actuator 130). After modifying the driver operation in S1025, the process can end.

Figure 11:
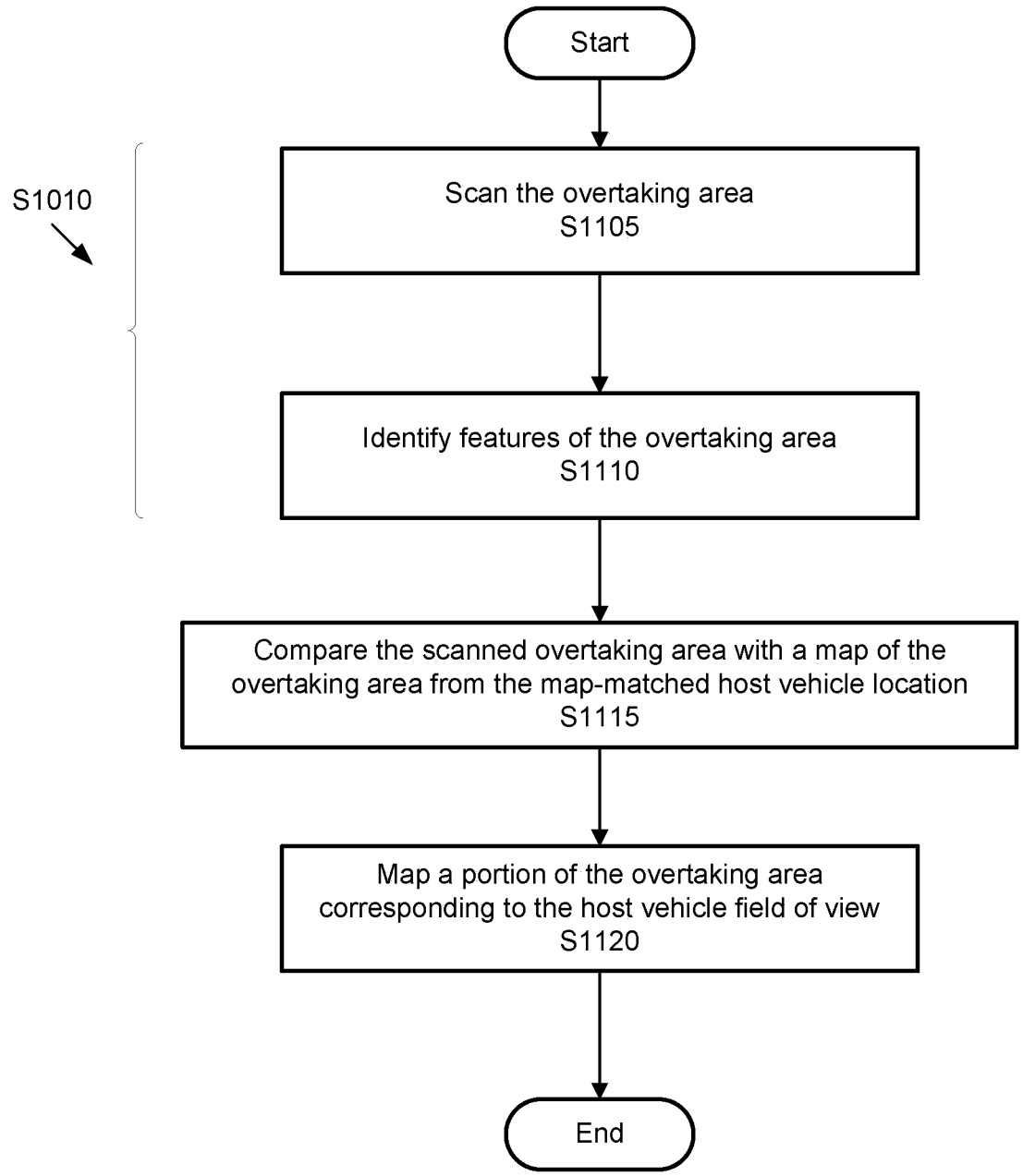
FIG. 11 is an algorithmic flow chart of a method for mapping a portion of the overtaking area corresponding to the host vehicle field of view according to one or more aspects of the disclosed subject matter.

FIG. 11 is an algorithmic flow chart of a method for mapping a portion of the overtaking area (e.g., overtaking area 800) corresponding to the host vehicle field of view according to one or more aspects of the disclosed subject matter. In FIG. 11, steps S1105 and S1110 can correspond to S1010, for example.

In S1105, the plurality of sensors 110 can scan the overtaking area. The information gathered by the plurality of sensors 110 can include information regarding any features of the overtaking area. For example, the plurality of sensors 110 can gather information about the traffic in the overtaking area, a topology of the overtaking area, a road type of the overtaking area, and the like.

In S1110, the processing circuitry 120 can identify features of the overtaking area based on the scan in S1105. The features identified can include traffic in the overtaking area, a specific topology of the overtaking area, the road type of the overtaking area, and the like as further described herein.

In S1115, the processing circuitry 120 can compare the scanned overtaking area with a map of the overtaking area from the map-matched host vehicle location.

In S1120, the processing circuitry 120 can map a portion of the overtaking area corresponding to the host vehicle field of view based on the comparison of the scanned overtaking area with the map of the overtaking area from the map-matched host vehicle location. In other words, based on comparing the map of the overtaking area with the host vehicle field of view, the features that are specifically in the portion of the overtaking area corresponding to the host vehicle field of view can be identified. After mapping the portion of the overtaking area corresponding to the host vehicle field of view, the process can end.

Figure 12:
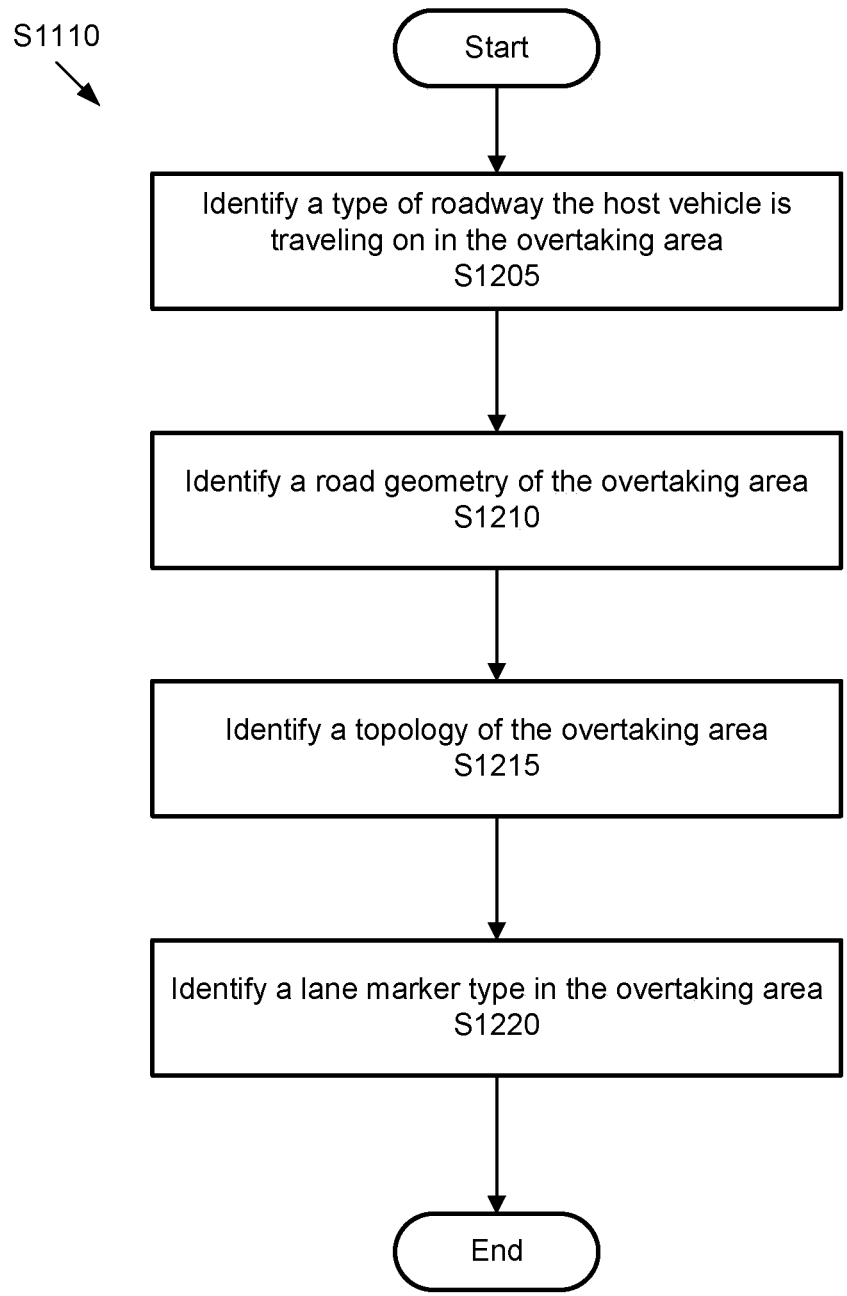
FIG. 12 is an algorithmic flow chart of a method for identifying features of the overtaking area according to one or more aspects of the disclosed subject matter.

FIG. 12 is an algorithmic flow chart of a method for identifying features of the overtaking area according to one or more aspects of the disclosed subject matter. In FIG. 12, steps S1205 through S1220 can correspond to S1110.

In S1205, the processing circuitry 120 can identify a type of roadway the host vehicle is traveling on in the overtaking area based on the information received from the plurality of sensors 110 from the scan of the overtaking area.

In S1210, the processing circuitry 120 can identify a road geometry of the overtaking area based on the information received from the plurality of sensors 110 from the scan of the overtaking area. For example, information about a curvature of the road and/or a location of the vehicle with respect to any changes in the road geometry received from the plurality of sensors 110 can be compared with the map of the overtaking area to identify the road geometry of the overtaking area (e.g., a curve in the road that could block a driver's field of view and prevent the driver from seeing an oncoming vehicle).

In S1215, the processing circuitry 120 can identify a topology of the overtaking area based on the information received from the plurality of sensors 110 from the scan of the overtaking area. Alternatively, or additionally, topology of the overtaking area can be identified based on the map from the map-matched location of the host vehicle 102. For example, the area surrounding the location of the host vehicle may have well known topology that may constrain the host vehicle field of view and/or the driver field of view (e.g., hills, trees, etc.).

In S1220, the processing circuitry 120 can identify a lane marker type in the overtaking area based on the information received from the plurality of sensors 110 from the scan of the overtaking area. After the lane marker type in the overtaking area is identified, the process can end.

Figure 13:
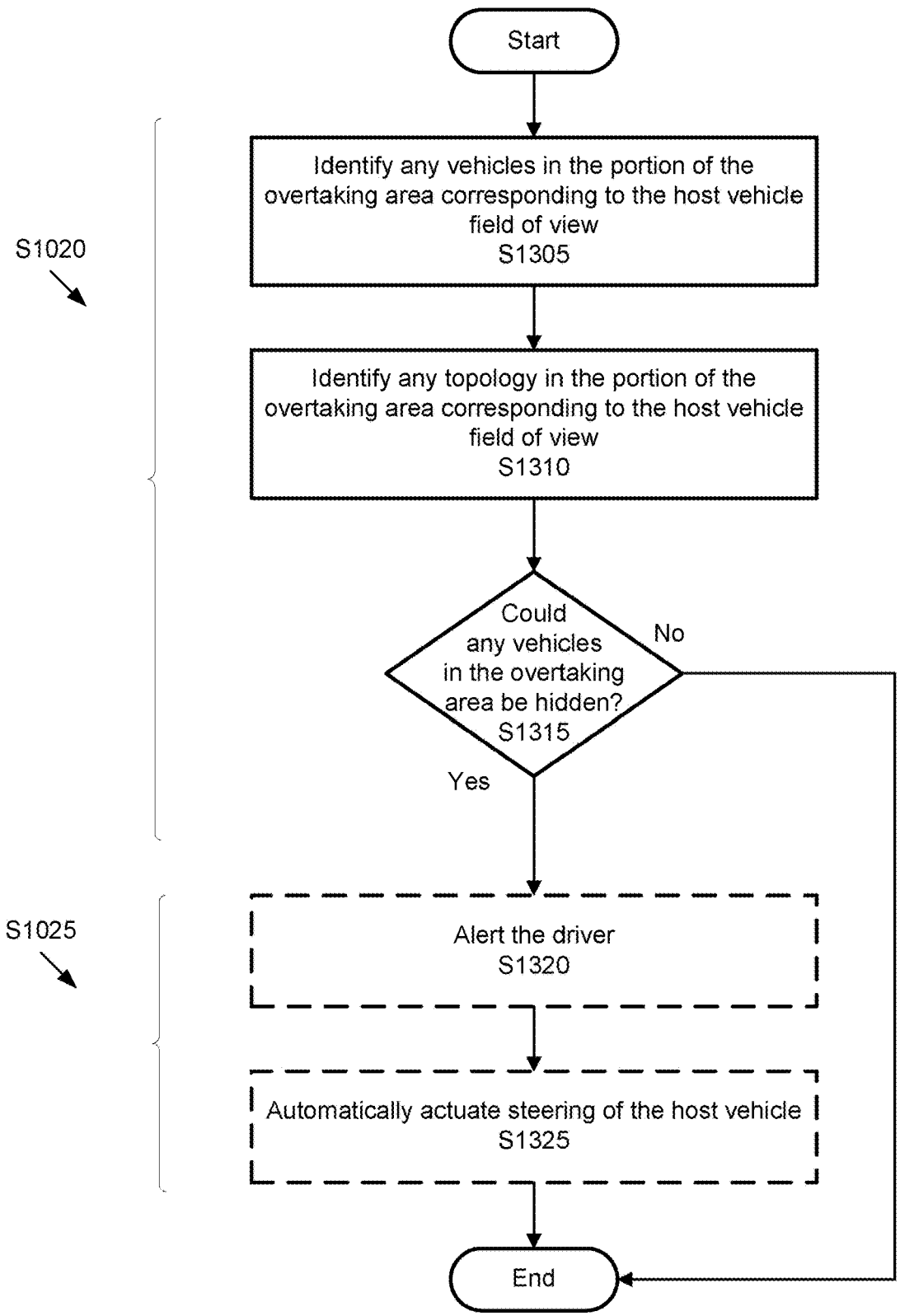
FIG. 13 is an algorithmic flow chart of a method for safely overtaking a preceding vehicle according to one or more aspects of the disclosed subject matter.

FIG. 13 is an algorithmic flow chart of a method for preventing unsafely overtaking a preceding vehicle according to one or more aspects of the disclosed subject matter. In FIG. 13, steps S1305 through S1315 can correspond to S1020 and steps S1320 and S1325 can correspond to S1025, for example.

In S1305, the processing circuitry 120 can identify any vehicles in the portion of the overtaking area corresponding to the host vehicle field of view based on the overtaking information received from the plurality of sensors 110.

In S1310, the processing circuitry 120 can identify any topology in the portion of the overtaking area corresponding to the host vehicle field of view based on the overtaking information received from the plurality of sensors 110 and/or the map information where the comparison of the map of the overtaking area from the map-matched host vehicle location can assist in identifying any topology in the overtaking area that is specifically in the host vehicle field of view.

In S1315, the processing circuitry 120 can determine if any vehicles could be hidden in the overtaking area. For example, the processing circuitry 120 can determine if one or more vehicles could be hidden by one or more of the identified vehicles in the host vehicle field of view, the road geometry of the overtaking area (e.g., the road curves outside the host vehicle field of view), and the topology in the host vehicle field of view (e.g., a hill in the overtaking area blocks at least a portion of the host vehicle field of view). In other words, determining whether any vehicles could be hidden in the overtaking area can assist in determining whether overtaking a preceding vehicle is safe because if a vehicle could be hidden then overtaking the preceding vehicle could be dangerous and should be avoided until it is safe to overtake the preceding vehicle. In response to a determination that a vehicle could not be hidden (e.g., nothing in the overtaking area could be blocking the host vehicle and/or driver field of view), the process can end. However, in response to a determination that a vehicle could be hidden, the host vehicle 102 can perform one or more of alerting the driver in S1320 and automatically actuating the steering of the host vehicle 102 in S1325.

In S1320, the processing circuitry 120 can alert the driver in response to the determination that one or more vehicles could be hidden in the overtaking area. The alert can include one or more of audio, visual, and tactile alerts informing the driver that overtaking the preceding vehicle is not safe. For example, overtaking the preceding vehicle may not be safe because a hidden vehicle may prevent the host vehicle from safely executing the overtaking maneuver, which may lead to a collision.

In S1325, the processing circuitry 120 can automatically actuate steering (e.g., by the steering actuator 130) of the host vehicle 102 in response to the determination that one or more vehicles could be hidden in the overtaking area. For example, the steering may be actuated automatically to prevent the host vehicle 102 and/or the driver of the host vehicle 102 from executing the overtaking maneuver. It should be appreciated that other vehicle controls can be configured to assist, independently or in combination, in modifying the host vehicle operation (e.g., acceleration, deceleration, braking, etc.) as needed. For example, deceleration can occur by braking, but may also correspond to reducing speed without braking (e.g., reducing or cutting power to an engine of the host vehicle). After automatically actuating steering of the host vehicle, the process can end. It should be appreciated that S1320 and S1325 may both occur, or, optionally, one of S1320 or S1325 can occur in response to the determination that overtaking the preceding vehicle is not safe, which can be selected ahead of time by the driver, for example.

Figure 14A:
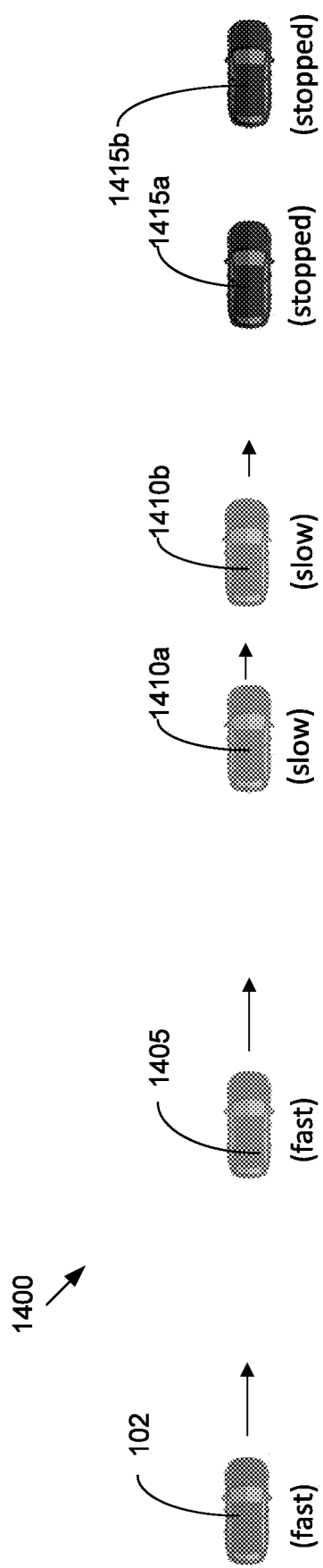
FIG. 14A illustrates an obstruction area according to one or more aspects of the disclosed subject matter.

FIG. 14A illustrates an obstruction area 1400 according to one or more aspects of the disclosed subject matter. In FIG. 14A, the obstruction area 1400 includes traffic occlusion. In other words, the host vehicle field of view is obstructed due to one or more preceding vehicles. The obstruction area 1400 includes a fast vehicle 1405, a first slow vehicle 1410a, a second slow vehicle 1410b, a first stopped vehicle 1415a, and a second stopped vehicle 1415b, for example. Due to the preceding vehicle being the fast vehicle 1405, the driver's field of view is not only blocked from seeing the stopped vehicles 1415a, 1415b, but also the fast vehicle 1405 appears to be operating at a normal speed with no indication of the upcoming slow and stopped traffic. As further described herein, the processing circuitry 120 can assist the host vehicle 102 by recognizing that the host vehicle field of view and/or the driver field of view is obstructed (e.g., traffic occlusion), and reduce the speed of the host vehicle 102 accordingly to prevent a collision with potentially slow and/or stopped traffic. It should be appreciated that the traffic occlusion example is exemplary and the processing circuitry 120 can assist the host vehicle 102 with various traffic occlusion situations including any number of fast, slow, and stopped vehicles.

Figure 14B:
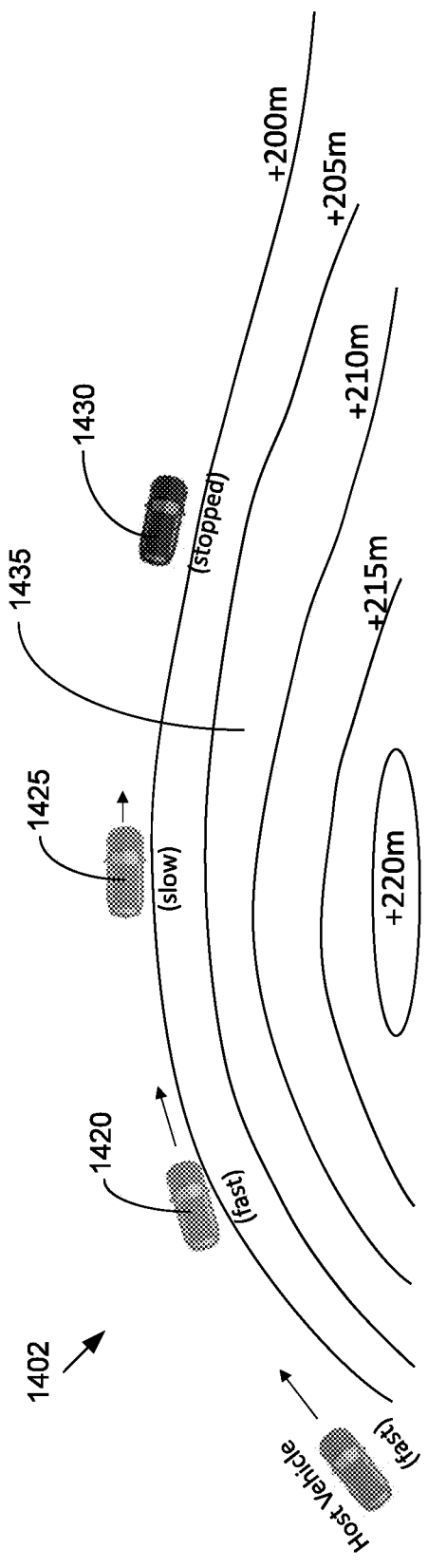
FIG. 14B illustrates an obstruction area according to one or more aspects of the disclosed subject matter.

FIG. 14B illustrates an obstruction area 1402 according to one or more aspects of the disclosed subject matter. In FIG. 14B, the obstruction area 1402 includes landscape (e.g., topology) occlusion 1435. In other words, the host vehicle field of view is obstructed due to a landscape and/or a topology of the obstruction area 1402. The obstruction area 1400 includes a fast vehicle 1420, a slow vehicle 1425, and a stopped vehicle 1430, for example. Due to the topology (e.g., landscape occlusion 1435) of the obstruction area 1400, the host vehicle field of view is obstructed and the host vehicle 102 may not be aware that slow and stopped vehicles are ahead. As further described herein, the processing circuitry 120 can assist the host vehicle 102 by recognizing that the host vehicle field of view and/or the driver field of view is obstructed (e.g., landscape occlusion 1435), and reduce the speed of the host vehicle 102 accordingly to prevent a collision with potentially slow and/or stopped traffic. It should be appreciated that the landscape occlusion 1435 example is exemplary and the processing circuitry 120 can assist the host vehicle 102 with various landscape occlusion situations including any type of landscape occlusion (e.g., hill, foliage, trees, walls, etc.) and any number of fast, slow, and stopped vehicles.

Figure 15:
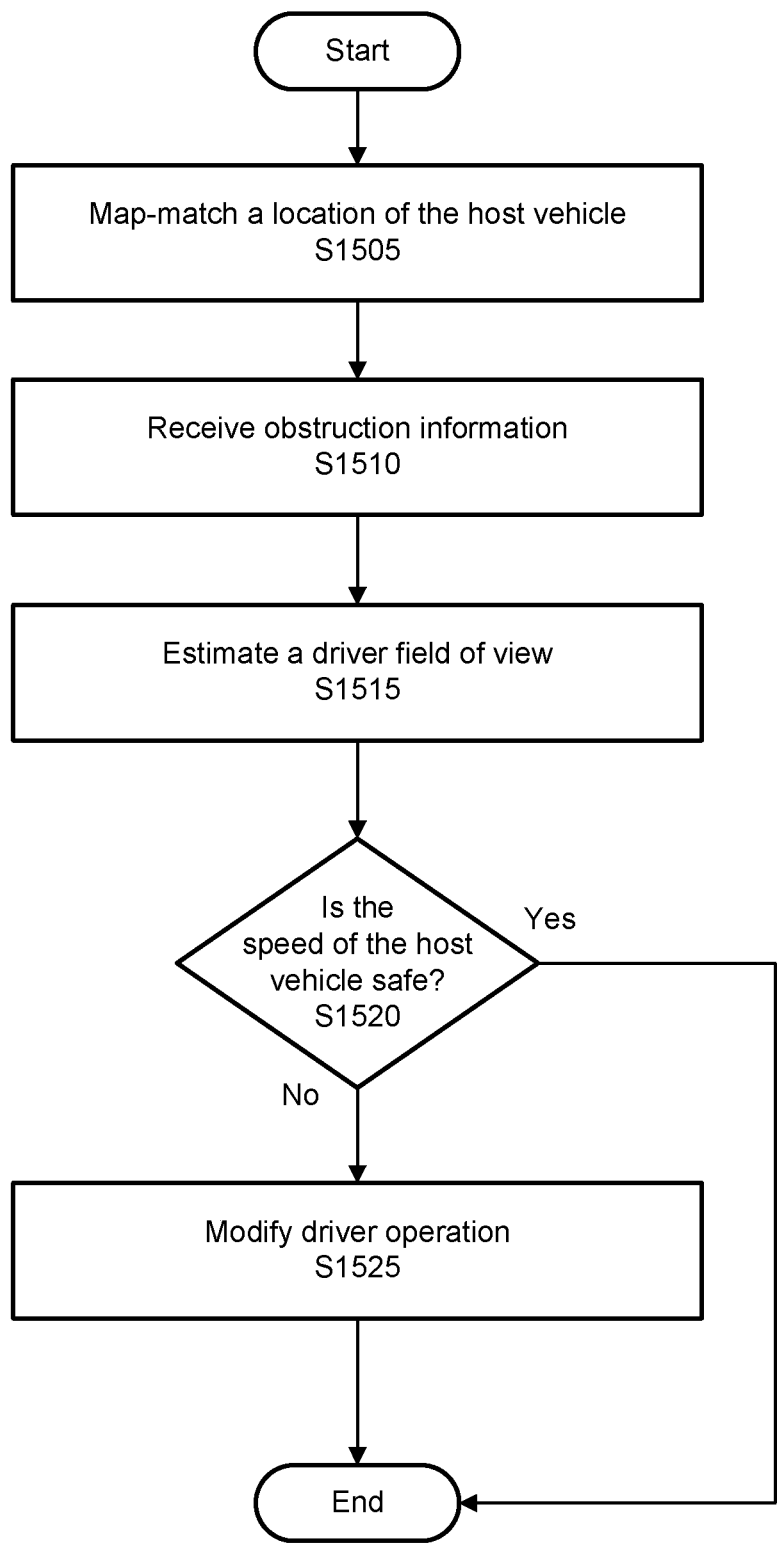
FIG. 15 is an algorithmic flow chart of a method for vehicle collision avoidance according to one or more aspects of the disclosed subject matter.

FIG. 15 is an algorithmic flow chart of a method for vehicle collision avoidance according to one or more aspects of the disclosed subject matter.

In S1505, the processing circuitry 120 can map-match a location of the host vehicle 102 while the host vehicle is operating on a highway.

In S1510, the processing circuitry 120 can receive obstruction information from the plurality of sensors 110. The obstruction information can include information regarding an obstruction area. Additionally, the plurality of sensors 110 can have a predetermined field of view corresponding to a field of view of the host vehicle as further described herein.

In S1515, the host vehicle 102 (e.g., via the processing circuitry 120) can estimate a driver field of view based on the host vehicle field of view as further described herein.

In S1520, the processing circuitry 120 can determine whether a speed of the host vehicle 102 is safe based on the driver field of view and/or the obstruction information. In response to a determination that the speed of the host vehicle 102 is safe, the process can end. However, in response to a determination that the speed of the host vehicle 102 is not safe, the host vehicle 102 can modify driver operation of the host vehicle field of view in S1525. Additionally, in one embodiment, a headway (average interval of time between vehicles moving in the same direction on the same route) of the host vehicle 102 can be used to determine whether driver operation of the host vehicle should be modified. The headway can be used in combination with the speed of the host vehicle based on their close relationship (e.g., when speed is increased the headway is decreased).

In S1525, the host vehicle 102 can modify driver operation in response to a determination that the speed of the host vehicle 102 is not safe based on the driver field of view and/or the obstruction information. For example, the host vehicle 102 (e.g., by the processing circuitry 120) can alert the driver to inform the driver that the speed of the host vehicle 102 is not safe and/or automatically actuate a braking system of the host vehicle 102 (e.g., reduce speed). After modifying the driver operation in S325, the process can end.

Figure 16:
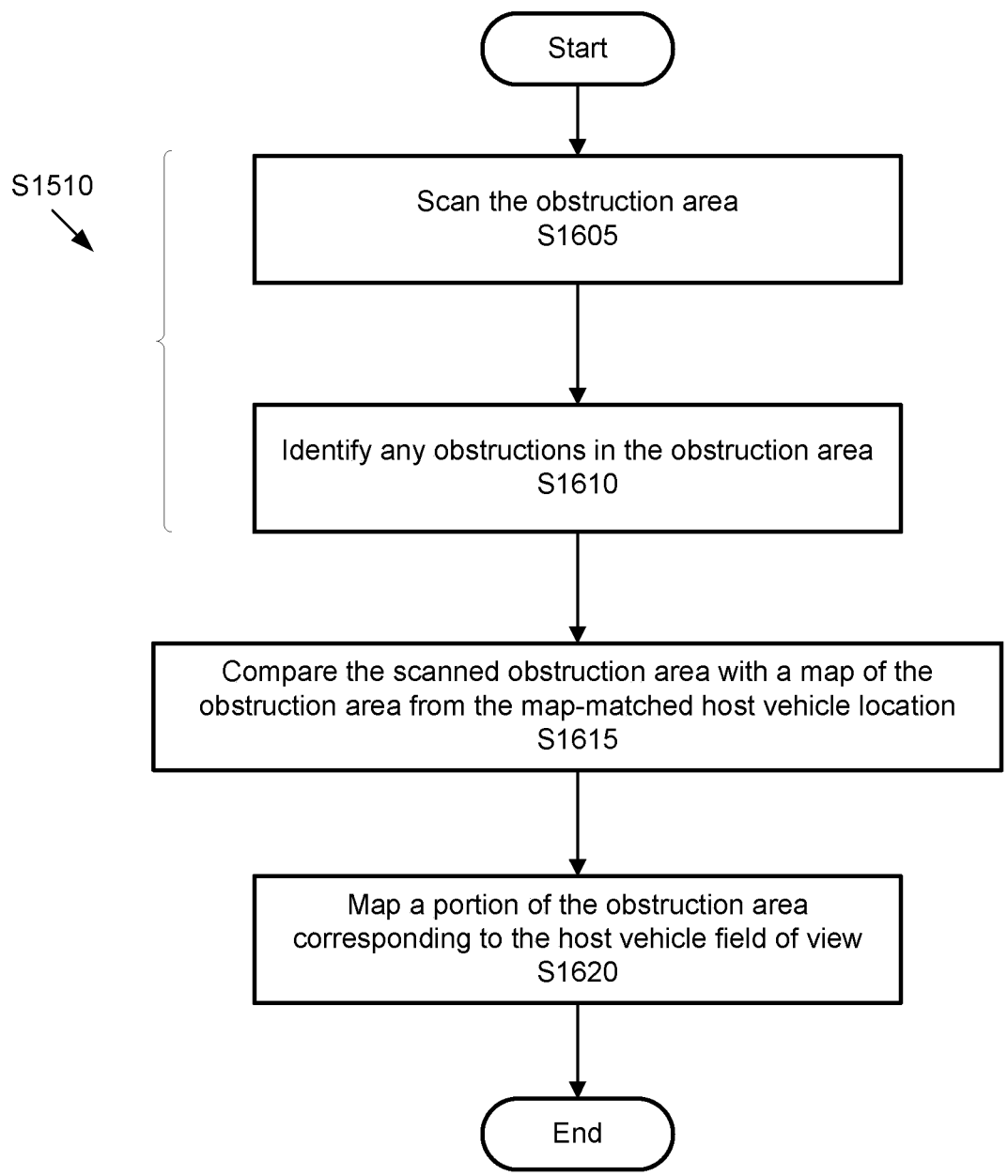
FIG. 16 is an algorithmic flow chart of a method for mapping a portion of the obstruction area corresponding to the host vehicle field of view according to one or more aspects of the disclosed subject matter.

FIG. 16 is an algorithmic flow chart of a method for mapping a portion of the obstruction area (e.g., obstruction area 1400, 1402) corresponding to the host vehicle field of view according to one or more aspects of the disclosed subject matter. In FIG. 16, steps S1605 and S1610 can correspond to S1510, for example.

In S1605, the plurality of sensors 110 can scan the obstruction area. The information gathered by the plurality of sensors 110 can include information regarding any traffic in the obstruction area and any features of the obstruction area. For example, the plurality of sensors 110 can gather information about one or more vehicles in the obstruction area, a topology of the obstruction area, and the like.

In S1610, the processing circuitry 120 can identify features of the obstruction area based on the scan in S1605. The features identified can include any traffic in the obstruction area (e.g., one or more vehicles, bikes, pedestrians, electric vehicles, etc.), a specific topology of the obstruction area (e.g., hills, foliage, walls, etc.), and the like.

In S1615, the processing circuitry 120 can compare the scanned obstruction area with a map of the obstruction area from the map-matched host vehicle location.

In S1620, the processing circuitry 120 can map a portion of the obstruction area corresponding to the host vehicle field of view based on the comparison of the scanned obstruction area with the map of the obstruction area from the map-matched host vehicle location. In other words, based on comparing the map of the obstruction area with the host vehicle field of view, the features that are specifically in the portion of the obstruction area corresponding to the host vehicle field of view can be identified. After mapping the portion of the obstruction area corresponding to the host vehicle field of view, the process can end.

Figure 17:
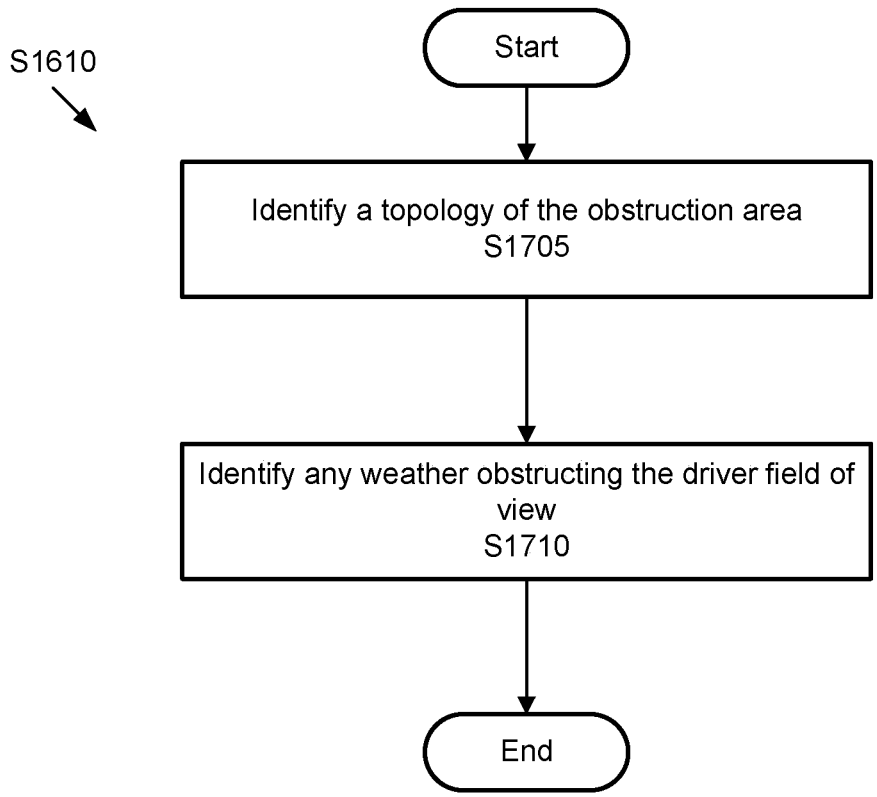
FIG. 17 is an algorithmic flow chart of a method for identifying any obstructions in the obstruction area according to one or more aspects of the disclosed subject matter.

FIG. 17 is an algorithmic flow chart of a method for identifying any obstructions in the obstruction area according to one or more aspects of the disclosed subject matter. In FIG. 17, steps S1705 and S1710 can correspond to S1610 in FIG. 16.

In S1705, the processing circuitry 120 can identify a topology of the obstruction area based on scan of the obstruction area. Alternatively, or additionally, topology of the obstruction area can be identified based on the map from the map-matched location of the host vehicle 102. For example, the area surrounding the location of the host vehicle may have well known topology that may obstruct the host vehicle field of view and/or the driver field of view (e.g., hills, trees, foliage, walls, etc.).

In S1710, the processing circuitry 120 can identify any weather obstructing the driver field of view based on the information received from the plurality of sensors 110. For example, the plurality of sensors 110 can determine if it is raining (e.g., imaging device, windshield wiper sensor, etc.), and because the rain and/or windshield wipers may obstruct the driver field of view, the weather obstructing the driver field of view can be taken into account when determining whether the speed of the host vehicle 102 is safe. Additional weather obstructions may include sunlight, fog, snow, and the like, for example. After identifying any weather obstructing the driver field of view, the process can end.

Figure 18:
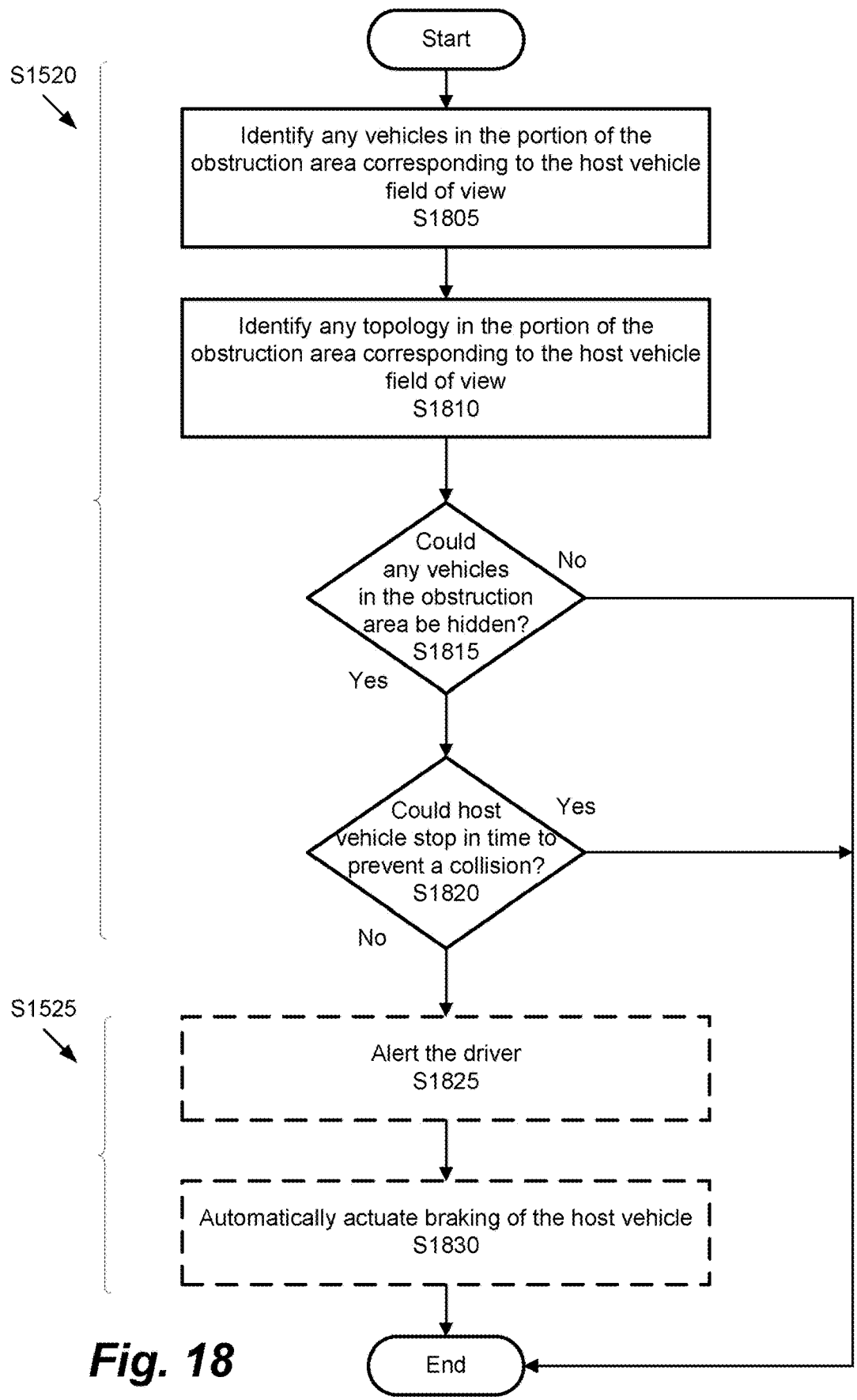
FIG. 18 is an algorithmic flow chart of a method for determining whether the speed of the host vehicle is safe based on the driver field of view according to one or more aspects of the disclosed subject matter.

FIG. 18 is an algorithmic flow chart of a method for determining whether the speed of the host vehicle is safe based on the driver field of view according to one or more aspects of the disclosed subject matter. In FIG. 18, steps S1805 through S1820 can correspond to S1520 and steps S1825 and S1830 can correspond to S1525.

In S1805, the processing circuitry 120 can identify any vehicles in the portion of the obstruction area corresponding to the host vehicle field of view based on the obstruction information received from the plurality of sensors 110.

In S1810, the processing circuitry 120 can identify any topology in the portion of the obstruction area corresponding to the host vehicle field of view based on the obstruction information received from the plurality of sensors 110 and/or the map information where the comparison of the map of the obstruction area from the map-matched host vehicle location can assist in identifying any topology in the obstruction area that is specifically in the host vehicle field of view.

In S1815, the processing circuitry 120 can determine whether any vehicles could be hidden in the obstruction area. For example, the processing circuitry 120 can determine if one or more vehicles could be hidden by one or more of the identified vehicles in the host vehicle field of view and/or the topology in the host vehicle field of view (e.g., a hill in the obstruction area blocks at least a portion of the host vehicle field of view). In other words, determining whether any vehicles could be hidden in the obstruction area can assist in determining whether the speed of the host vehicle 102 is safe because if a vehicle could be hidden then the speed of the host vehicle 102 could be dangerous if the one or more hidden vehicle is driving much slower or is stopped. For example, due to an accident on a highway, traffic may be slow and or stopped, and when the slow and/or stopped traffic is hidden behind other vehicles in front of the host vehicle 102 and/or the topology of the area, the speed of the host vehicle 102 should be reduced until the processing circuitry 120 can confirm (e.g., via the plurality of sensors) that no vehicles are hidden in the obstruction area. In response to a determination that a vehicle could not be hidden (e.g., nothing in the obstruction area could be blocking the host vehicle and/or driver field of view), the process can end. However, in response to a determination that one or more vehicles could be hidden, the processing circuitry 120 can determine whether the host vehicle 102 could stop in time to prevent a collision in S1820.

In S1820, the processing circuitry 120 can determine whether the host vehicle 102 could stop in time to prevent a collision based on the speed of the host vehicle 102 and the distance to a potentially hidden vehicle, for example. In response to a determination that the host vehicle 102 could stop in time, the process can end. However, in response to a determination that the host vehicle 102 could not stop in time, the host vehicle 102 can perform one or more of alerting the driver in S1825 and automatically actuating a braking system of the host vehicle 102 in S1830.

In S1825, the processing circuitry 120 can alert the driver in response to the determination that one or more vehicles could be hidden in the obstruction area. The alert can include one or more of audio, visual, and tactile alerts informing the driver that the speed of the host vehicle 102 is not safe. For example, the speed of the host vehicle 102 may not be safe because if there is a hidden vehicle, the host vehicle 102 may not be able to stop in time to avoid a collision.

In S1830, the processing circuitry 120 can automatically actuate a braking system (e.g., by the braking actuator 140) of the host vehicle 102 in response to the determination that one or more vehicles could be hidden in the obstruction area. For example, the braking may be actuated automatically to reduce the speed of the host vehicle 102 so that the host vehicle 102 would be able to stop in time to avoid a collision if there was one or more hidden vehicles in the obstruction area. After automatically actuating the braking system of the host vehicle 102, the process can end. It should be appreciated that S1825 and S1830 may both occur, or, optionally, one of S1825 or S1830 can occur in response to the determination that the speed of the host vehicle 102 is not safe, which can be selected ahead of time by the driver, for example.

In the above description of FIGS. 3-7, 10-13, and 15-18, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 19:
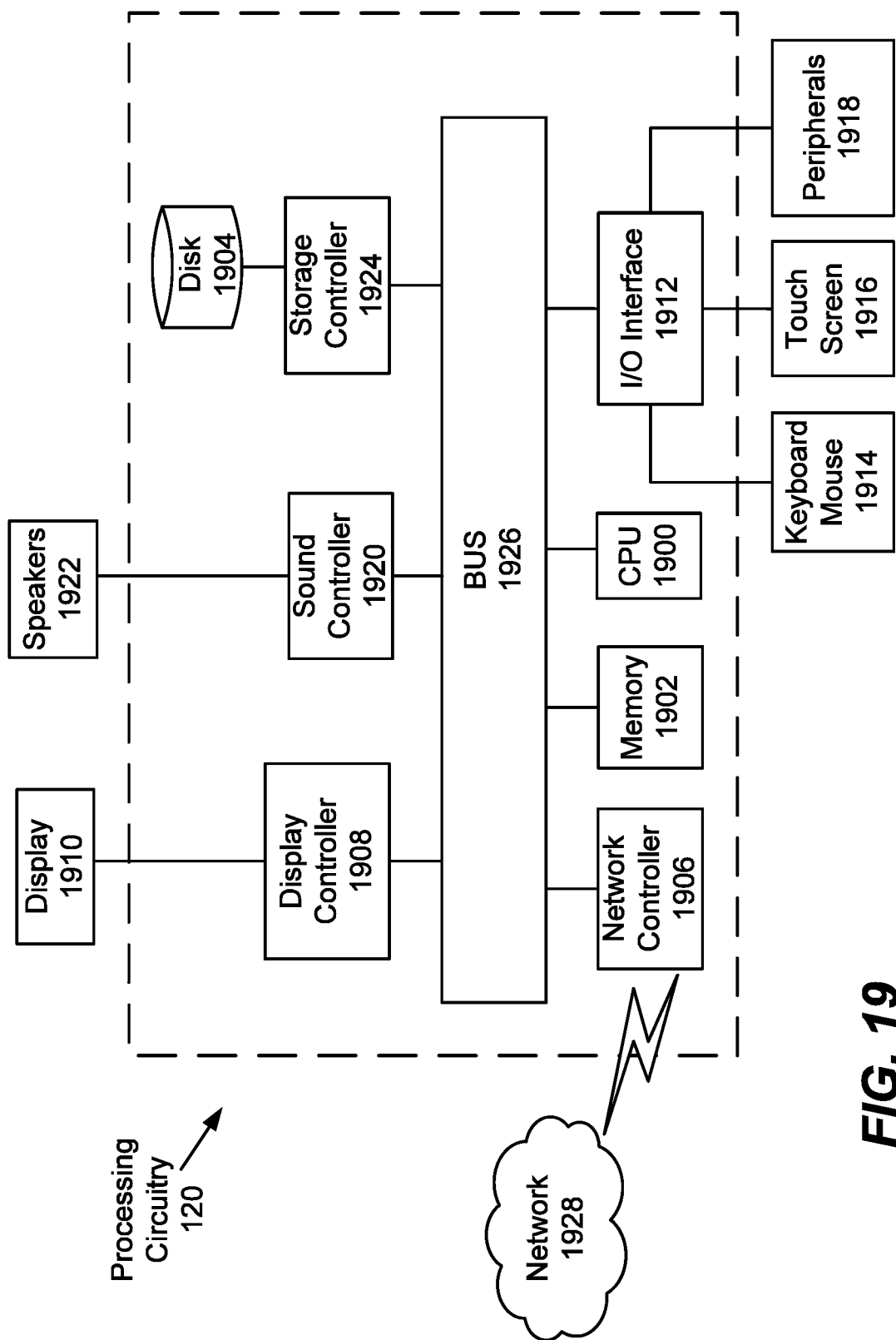
FIG. 19 illustrates a hardware block diagram of processing circuitry of the host vehicle according to one or more exemplary aspects of the disclosed subject matter.

Next, a hardware description of the processing circuitry 120 according to exemplary embodiments is described with reference to FIG. 19. The hardware description described herein can also be a hardware description of the processing circuitry. In FIG. 19, the processing circuitry 120 includes a CPU 1900 which performs one or more of the processes described above/below. The process data and instructions may be stored in memory 1902. These processes and instructions may also be stored on a storage medium disk 1904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing circuitry 120 communicates, such as a server or computer.

Further, the claimed advancements may be provided as a utility application, background daemon, or component of an operating system, or combination thereof, executing in conjunction with CPU 1900 and an operating system such as MICROSOFT Windows, UNIX, SOLARIS, LINUX, APPLE MAC-OS and other systems known to those skilled in the art.

The hardware elements in order to achieve the processing circuitry 120 may be realized by various circuitry elements. Further, each of the functions of the above described embodiments may be implemented by circuitry, which includes one or more processing circuits. A processing circuit includes a particularly programmed processor, for example, processor (CPU) 1900, as shown in FIG. 19. A processing circuit also includes devices such as an application specific integrated circuit (ASIC) and conventional circuit components arranged to perform the recited functions.

In FIG. 19, the processing circuitry 120 includes a CPU 1900 which performs the processes described above. The processing circuitry 120 may be a general-purpose computer or a particular, special-purpose machine. In one embodiment, the processing circuitry 120 becomes a particular, special-purpose machine when the processor 1900 is programmed to improve the safety in various driving situations including navigating a traffic intersection, overtaking a preceding vehicle, and avoiding collisions with sudden slow and/or stopped traffic on a highway (and in particular, any of the processes discussed with reference to FIGS. 3-7, 10-13, and 15-18).

Alternatively, or additionally, the CPU 1900 may be implemented on an FPGA, ASIC, PLD or using discrete logic circuits, as one of ordinary skill in the art would recognize. Further, C P U 1900 may be implemented as multiple processors cooperatively working in parallel to perform the instructions of the inventive processes described above.

The processing circuitry 120 in FIG. 19 also includes a network controller 1906, such as an INTEL Ethernet PRO network interface card from Intel Corporation of America, for interfacing with network 1928. As can be appreciated, the network 1928 can be a public network, such as the Internet, or a private network such as an LAN or WAN network, or any combination thereof and can also include PSTN or ISDN sub-networks. The network 1928 can also be wired, such as an Ethernet network, or can be wireless such as a cellular network including EDGE, 3G and 4G wireless cellular systems. The wireless network can also be WiFi, BLUETOOTH, or any other wireless form of communication that is known.

The processing circuitry 120 further includes a display controller 1908, such as a graphics card or graphics adaptor for interfacing with display 1910, such as a monitor. A general purpose I/O interface 1912 interfaces with a keyboard and/or mouse 1914 as well as a touch screen panel 1916 on or separate from display 1910. General purpose I/O interface also connects to a variety of peripherals 1918 including printers and scanners.

A sound controller 1920 is also provided in the processing circuitry 120 to interface with speakers/microphone 1922 thereby providing sounds and/or music.

The general purpose storage controller 1924 connects the storage medium disk 1904 with communication bus 1926, which may be an ISA, EISA, VESA, PCI, or similar, for interconnecting all of the components of the processing circuitry 120. A description of the general features and functionality of the display 1910, keyboard and/or mouse 1914, as well as the display controller 1908, storage controller 1924, network controller 1906, sound controller 1920, and general purpose I/O interface 1912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A host vehicle, comprising:
a plurality of sensors communicably coupled to the host vehicle, and
processing circuitry configured to:
   map-match a location of the host vehicle while the host vehicle is operating on a highway,
   cause the plurality of sensors to scan an obstruction area,
   receive obstruction information from the plurality of sensors, the plurality of sensors having a predetermined field of view corresponding to a field of view of the host vehicle,
   identify any obstructions in the obstruction area based upon the obstruction information,
   identify a topology of the obstruction area,
   estimate a driver field of view based on the host vehicle field of view,
   determine whether or not one or more of a speed and a headway of the host vehicle is safe based on the driver field of view and the obstruction information, including:
      identifying any vehicles and/or any topology in a portion of the obstruction area corresponding to the host vehicle field of view,
      determining whether any vehicles could be hidden by one or more of the identified vehicles and/or topology in the host vehicle field of view, and
      determining whether or not the host vehicle could stop in time to prevent a collision with any hidden vehicles, including any vehicles outside a range of the host vehicle field of view, and
   modify a driver operation in response to a determination that the one or more of the speed and the headway of the host vehicle is not safe based on the driver field of view.

2. The host vehicle of claim 1, wherein in response to receiving the obstruction information from the plurality of sensors, the processing circuitry is further configured to:
compare the scanned obstruction area with a map of the obstruction area from the map-matched host vehicle location, and
map the portion of the obstruction area corresponding to the host vehicle field of view.

3. The host vehicle of claim 1, wherein the processing circuitry is further configured to identify any weather obstructing the driver field of view.

4. The host vehicle of claim 1, wherein the processing circuitry, for determining whether the one or more of the speed and the headway of the host vehicle is safe based on the driver field of view, is configured to:
identify any vehicles in the portion of the obstruction area corresponding to the host vehicle field of view,
identify any topology in the portion of the obstruction area corresponding the host vehicle field of view, and
determine whether any vehicles could be hidden by one or more of the identified vehicles in the host vehicle field of view and the identified topology in the host vehicle field of view.

5. The host vehicle of claim 1, wherein the processing circuitry, for modifying the driver operation in response to the determination that the one or more of the speed and the headway of the host vehicle is not safe based on the driver field of view, is configured to alert the driver in response to the determination that the host vehicle could not stop in time to prevent the collision with any hidden vehicles.

6. The host vehicle of claim 1, wherein the processing circuitry, for modifying the driver operation in response to the determination that the one or more of the speed and the headway of the host vehicle is not safe based on the driver field of view is configured to automatically actuate braking in response to the determination that the host vehicle could not stop in time to prevent the collision with any hidden vehicles.

7. A method for vehicle collision avoidance, comprising:
map-matching, by processing circuitry, a location of a host vehicle while the host vehicle is operating on a highway;
causing, by the processing circuitry, a plurality of sensors to scan an obstruction area;
receiving, by the processing circuitry, obstruction information from the plurality of sensors, the plurality of sensors having a predetermined field of view corresponding to a field of view of the host vehicle;

identifying, by the processing circuitry, any obstructions in the obstruction area based upon the obstruction information;

identifying, by the processing circuitry, a topology of the obstruction area;

estimating, by the processing circuitry, a driver field of view based on the host vehicle field of view;

determining, by the processing circuitry, whether or not one or more of a speed and a headway of the host vehicle is safe based on the driver field of view and the obstruction information, including:

identifying any vehicles and/or any topology in a portion of the obstruction area corresponding to the host vehicle field of view, determining whether any vehicles could be hidden by one or more of the identified vehicles and/or topology in the host vehicle field of view, and determining whether or not the host vehicle could stop in time to prevent a collision with any hidden vehicles, including any vehicles outside a range of the host vehicle field of view; and modifying, by the processing circuitry, a driver operation in response to a determination that the one or more of the speed and the headway of the host vehicle is not safe based on the driver field of view.

8. The method of claim 7, wherein in response to receiving the obstruction information from the plurality of sensors, the method further comprises:

comparing the scanned obstruction area with a map of the obstruction area from the map-matched host vehicle location; and mapping the portion of the obstruction area corresponding to the host vehicle field of view.

9. The method of claim 7, wherein the method further comprises identifying any weather obstructing the driver field of view.

10. The method of claim 7, wherein determining whether or not the one or more of the speed and the headway of the host vehicle is safe based on the driver field of view comprises:

identifying any vehicles in the portion of the obstruction area corresponding to the host vehicle field of view;

identifying any topology in the portion of the obstruction area corresponding the host vehicle field of view; and determining whether any vehicles could be hidden by one or more of the identified vehicles in the host vehicle field of view and the identified topology in the host vehicle field of view.

11. The method of claim 7, wherein modifying the driver operation in response to the determination that the one or more of the speed and the headway of the host vehicle is not safe based on the driver field of view includes alerting the driver in response to the determination that the host vehicle could not stop in time to prevent the collision with any hidden vehicles.

12. The method of claim 7, wherein the modifying driver operation in response to the determination that the one or more of the speed and the headway of the host vehicle is not safe based on the driver field of view includes automatically actuating braking in response to the determination that the host vehicle could not stop in time to prevent the collision with any hidden vehicles.

13. A non-transitory computer-readable storage medium storing computer-readable instructions thereon which, when executed by a computer, cause the computer to perform a method, the method comprising:

map-matching a location of a host vehicle while the host vehicle is operating on a highway;

causing a plurality of sensors to scan an obstruction area;

receiving obstruction information from the plurality of sensors, the plurality of sensors having a predetermined field of view corresponding to a field of view of the host vehicle;

identifying any obstructions in the obstruction area based upon the obstruction information;

identifying a topology of the obstruction area;

estimating a driver field of view based on the host vehicle field of view;

determining whether or not one or more of a speed and a headway of the host vehicle is safe based on the driver field of view and the obstruction information, including:

identifying any vehicles and/or any topology in a portion of the obstruction area corresponding to the host vehicle field of view, determining whether any vehicles could be hidden by one or more of the identified vehicles and/or topology in the host vehicle field of view, and determining whether or not the host vehicle could stop in time to prevent a collision with any hidden vehicles, including any vehicles outside a range of the host vehicle field of view; and modifying a driver operation in response to a determination that the one or more of the speed and the headway of the host vehicle is not safe based on the driver field of view.

14. The non-transitory computer-readable storage medium of claim 13, wherein in response to receiving the obstruction information from the plurality of sensors, the method further comprises:

comparing the scanned obstruction area with a map of the obstruction area from the map-matched host vehicle location; and mapping the portion of the obstruction area corresponding to the host vehicle field of view.

15. The non-transitory computer-readable storage medium of claim 13, wherein the method further comprises identifying any weather obstructing the driver field of view.

16. The non-transitory computer-readable storage medium of claim 13, wherein determining whether or not the one or more of the speed and the headway of the host vehicle is safe based on the driver field of view comprises:

identifying any vehicles in the portion of the obstruction area corresponding to the host vehicle field of view;

identifying any topology in the portion of the obstruction area corresponding the host vehicle field of view; and determining whether any vehicles could be hidden by one or more of the identified vehicles in the host vehicle field of view and the identified topology in the host vehicle field of view.

17. The non-transitory computer-readable storage medium of claim 15, wherein modifying the driver operation in response to the determination that the one or more of the speed and the headway of the host vehicle is not safe based on the driver field of view includes one or more of alerting the driver in response to the determination that the host vehicle could not stop in time to prevent the collision with any hidden vehicles and automatically actuating braking in response to the determination that the host vehicle could not stop in time to prevent the collision with any hidden vehicles.

\* \* \* \* \*